(12) United States Patent
Harada et al.

(10) Patent No.: US 12,193,034 B2
(45) Date of Patent: Jan. 7, 2025

(54) TERMINAL AND BASE STATION

(71) Applicant: NTT DOCOMO, INC., Tokyo (JP)

(72) Inventors: Hiroki Harada, Tokyo (JP); Daisuke Kurita, Tokyo (JP); Satoshi Nagata, Tokyo (JP); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 370 days.

(21) Appl. No.: 17/793,305

(22) PCT Filed: Jan. 24, 2020

(86) PCT No.: PCT/JP2020/002623
§ 371 (c)(1),
(2) Date: Jul. 15, 2022

(87) PCT Pub. No.: WO2021/149258
PCT Pub. Date: Jul. 29, 2021

(65) Prior Publication Data
US 2023/0050703 A1     Feb. 16, 2023

(51) Int. Cl.
*H04W 16/14*     (2009.01)
*H04W 72/30*     (2023.01)
(52) U.S. Cl.
CPC .................. *H04W 72/30* (2023.01)
(58) Field of Classification Search
None
See application file for complete search history.

(56) References Cited

U.S. PATENT DOCUMENTS

| 10,790,956 B2* | 9/2020 | Cheng | H04L 5/0051 |
| 2014/0126490 A1* | 5/2014 | Chen | H04L 5/0035 370/328 |
| 2018/0331860 A1* | 11/2018 | Bergman | H04L 25/0204 |
| 2019/0045488 A1* | 2/2019 | Park | H04L 5/0048 |
| 2019/0058517 A1* | 2/2019 | Kang | H04L 5/0094 |
| 2019/0159209 A1* | 5/2019 | Xiao | H04W 28/06 |
| 2020/0162228 A1* | 5/2020 | Gao | H04L 5/10 |

FOREIGN PATENT DOCUMENTS

JP     2019-534591 A     11/2019

OTHER PUBLICATIONS

International Search Report issued in Application No. PCT/JP2020/002623 mailed on Aug. 4, 2020 (5 pages).
(Continued)

*Primary Examiner* — Ajit Patel
(74) *Attorney, Agent, or Firm* — Osha Bergman Watanabe & Burton LLP

(57) ABSTRACT

A terminal includes a reception unit that receives a synchronization signal block in an unlicensed band of a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a control unit that identifies an index of a candidate position for transmitting the synchronization signal block based on a sequence of a demodulation reference signal of a broadcast channel included in the synchronization signal block and a payload of the broadcast channel.

5 Claims, 17 Drawing Sheets

(56) References Cited

OTHER PUBLICATIONS

Written Opinion issued in Application No. PCT/JP2020/002623 mailed on Aug. 4, 2020 (4 pages).
Qualcomm, "New WID on Extending current NR operation to 71 GHz", 3GPP TSG RAN Meeting #86, RP-193229, Sitges, Spain, Dec. 9-12, 2019 (5 pages).
3GPP TS 38.101-2, "3rd Generation Partnership Project; Technical Specification Group Radio Access Network; NR; User Equipment (UE) radio transmission and reception; Part 2: Range 2 Standalone (Release 15)" Dec. 2019 (144 pages).
Ericsson, "WF on the NR-U channel raster on 5GHz band", 3GPP TSG-RAN4 Meeting #92bis, R4-1912870, Chongqing, China, Oct. 14-18, 2019 (10 pages).
Qualcomm Incorporated, "Draft CR channel raster in band n46 for NR-U operation", 3GPP TSG-RAN WG4 #93, R4-1916167, Reno, United States, Nov. 18-22, 2019 (3 pages).
Qualcomm Incorporated, "WF for sync raster for NR-U", 3GPP TSG-RAN WG4 Meeting #92bis, R4-1912982, Chongqing, China, Oct. 14-18, 2019 (4 pages).
Futurewei, "Draft CR for Sync raster design for NR-U in 38.104" 3GPP TSG-RAN WG4 Meeting #93, R4-1915982, Reno, US, Nov. 18-22, 2019 (3 pages).
3GPP TS 38.331 V15.8.0 , "3rd Generation Partnership Project; Technical Specification Group Radio Access Network; NR; Radio Resource Control (RRC) protocol specification (Release 15)" Dec. 2019 (532 pages).
3GPP TS 38.213 V15.8.0 , "3rd Generation Partnership Project; Technical Specification Group Radio Access Network; NR; Physical layer procedures for control (Release 15)", Dec. 2019 (110 pages).
Intel Corporation, "New SID: Study on supporting NR from 52.6GHz to 71 GHz" 3GPP TSG RAN Meeting #86, RP-193259, Sitges, Spain, Dec. 9-12, 2019 (4 pages).
ZTE, Sanechips, "Discussion on enhancement of initial access procedures for NR-U", 3GPP TSG RAN WG1 Meeting #97, R1-1905952, Reno, USA, May 13-17, 2019 (17 pages).
Ericsson, "Enhancements to initial access procedure", 3GPP TSG-RAN WG1 Meeting #99, R1-1912710, Reno, USA, Nov. 18-22, 2019 (24 pages).
Office Action issued in counterpart Japanese Patent Application No. 2021-572247 mailed on Dec. 5, 2023 (6 pages).
Extended European Search Report issued in counterpart European Application No. 20914806.3 mailed on Sep. 6, 2023 (9 pages).
OPPO; "Enhancements to initial access procedure for NR-U"; 3GPP TSG RAN WG1 #98, R1-1908418; Prague, CZ; Aug. 26-30, 2019 (6 pages).
Samsung; "Enhancements to Initial Access Procedure for NR-U"; 3GPP TSG RAN WG1 Ad-hoc Meeting 1901, R1-1901032; Taipei, Taiwan; Jan. 21-25, 2019 (10 pages).

\* cited by examiner

FIG.15

TERMINAL AND BASE STATION

TECHNICAL FIELD

The present invention relates to a terminal and a base station in a radio communication system.

BACKGROUND ART

In new ratio (NR) of Release 15 and NR of Release 16 of a third generation partnership project (3GPP), a frequency band up to the upper limit of 52.6 GHz is the target. With regard to extension of NR to a frequency band higher than or equal to 52.6 GHz, in Release 16, a study item exists at a technical specification group radio access network (TSG RAN) level in which various regulations, use cases, requirements, and the like are to be studied. The study of the study item has been completed in December 2019, and in Release 17, a study item and a work item for actually extending a technical specification to 52.6 GHz or higher have been agreed.

In the study item in Release 16, as an NR frequency band, extension from 52.6 GHz to 114.25 GHz was assumed, but in Release 17, time for the study is limited, and, thus, it is assumed that the frequency band to be studied is limited to a range from 52.6 GHz to 71 GHz. In addition, when extending the NR frequency band from 52.6 GHz to 71 GHz, it is assumed that extension is carried out on the basis of design of current NR frequency range 2 (FR2).

RELATED ART DOCUMENT

Non-Patent Document

Non-Patent Document 1: 3GPP TSG RAN Meeting #86, RP-193229, Sitges, Spain, Dec. 9 to 12, 2019
Non-Patent Document 2: 3GPP TS 38.101-2 V15.8.0 (2019-12)
Non-Patent Document 3: 3GPP TSG-RAN4 Meeting #92bis, R4-1912870, Chongqing, China, 14 to 18 Oct. 2019
Non-Patent Document 4: 3GPP TSG-RAN4 Meeting #93, R4-1916167, Reno, United States, 18 to 22 Nov. 2019
Non-Patent Document 5: 3GPP TSG-RAN4 Meeting #92bis, R4-1912982, Chongqing, China, 14 to 18 Oct. 2019
Non-Patent Document 6: 3GPP TSG-RAN4 Meeting #93, R4-1915982, Reno, US, Nov. 18 to 22, 2019
Non-Patent Document 7: 3GPP TS 38.331 V15.8.0 (2019-12)
Non-Patent Document 8: 3GPP TS 38.213 V15.8.0 (2019-12)

SUMMARY OF THE INVENTION

Problem to be Solved by the Invention

A frequency band of 52.6 GHz to 71 GHz includes an unlicensed band of 60 GHz, and, thus, an extension of a function with respect to a licensed frequency band, and an extension of a function with respect to an unlicensed frequency may be necessary as an extension of a function for the frequency band from 52.6 GHz to 71 GHz.

There is a need for a technology that allows SSB transmission with efficiency and high reliability in a high frequency band higher than or equal to the frequency band of NR FR2, with a minimum change from an FR2 technical specification.

Means for Solving the Problem

According to an aspect of the present invention, there is provided a terminal including a reception unit that receives a synchronization signal block in an unlicensed band of a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a control unit that identifies an index of a candidate position for transmitting the synchronization signal block based on a sequence of a demodulation reference signal of a broadcast channel included in the synchronization signal block and a payload of the broadcast channel.

Advantage of the Invention

According to an embodiment, there is provided a technology that allows an SSB transmission with efficiency and high reliability in a high frequency band higher than or equal to a frequency band of NR FR2, with a minimum change from an FR2 technical specification.

BRIEF DESCRIPTION OF DRAWINGS

FIG. 15 is a diagram illustrating an example of deriving an SSB index from an SSB candidate position and a QCL parameter.

EMBODIMENTS OF THE INVENTION

Hereinafter, an embodiment of the invention will be described with reference to the accompanying drawings. Note that, the following embodiment is illustrative only, and embodiments to which the invention is applied are not limited to the following embodiments.

It is assumed that a radio communication system in the following embodiments basically conform to NR, but this is merely an example, and the radio communication system in the embodiments may partially or entirely conform to a radio communication system (for example, LTE) other than the NR.

(Overall System Configuration)

Figure 1:
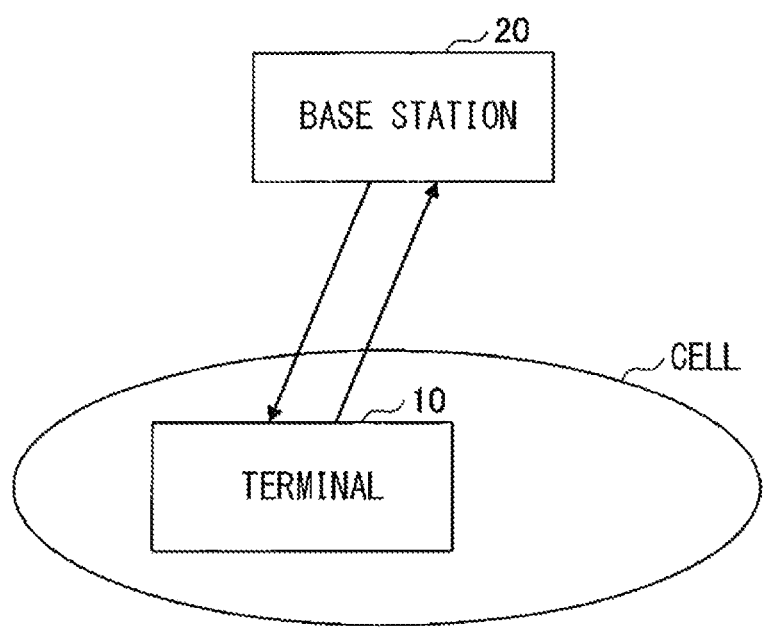
FIG. 1 is a configuration diagram of a communication system in an embodiment.

FIG. 1 illustrates a configuration diagram of the radio communication system according to the embodiments. As illustrated in FIG. 1, the radio communication system according to the embodiments includes a terminal 10 and a base station 20. In FIG. 1, one piece of the terminal 10 and one piece of the base station 20 are illustrated, but this is an example, and a plurality of the terminals 10 and a plurality of the base stations 20 may be provided.

The terminal 10 is a communication device such as a smart phone, a portable telephone, a tablet, a wearable terminal, and a communication module for machine-to-machine (M2M) which have a radio communication function. The terminal 10 receives a control signal or data from the base station 20 in DL, and transmits the control signal or the data to the base station 20 in UL to use various communication services provided by the radio communication system. For example, a channel transmitted from the terminal 10 includes a physical uplink control channel (PUCCH) and a physical uplink shared channel (PUSCH). In addition, the terminal 10 may be referred to as a UE, and the base station 20 may be referred to as a gNB.

In the embodiments, a duplex method may be a time division duplex (TDD) method or a frequency division duplex (FDD) method.

In addition, in the embodiment, with regard to description of "a radio parameter or the like is configured", a predetermined value may be pre-configured, or may be configured on the basis of a radio parameter indicated by the base station 20 or the terminal 10.

The base station 20 is a communication device that provides one or more cells and that performs radio communication with the terminal 10. Physical resources of a radio signal are defined in a time domain and a frequency domain, the time domain may be defined by a number of OFDM symbols, and the frequency domain may be defined by a number of sub-carriers or a number of resource blocks. The base station 20 transmits synchronization signals and system information to the terminal 10. The synchronization signals are, for example, NR-PSS and NR-SSS. A part of the system information is transmitted, for example, by NR-PBCH, and is also called broadcast information. The synchronization signal and broadcast information may be periodically transmitted as an SS block (SS/PBCH block) formed of a predetermined number of OFDM symbols. For example, the base station 20 transmits a control signal or data in Downlink (DL) to the terminal 10 and receives a control signal or data in Uplink (UL) from the terminal 10. Both the base station 20 and the terminal 10 are capable of beam forming to transmit and receive signals. For example, a reference signal transmitted from the base station 20 includes a Channel State Information Reference Signal (CSI-RS) and a channel transmitted from the base station 20 includes a Physical Downlink Control Channel (PDCCH) and a Physical Downlink Shared Channel (PDSCH).

(Extension of NR to Frequency Band Higher than or Equal to 52.6 GHz)

Under the new radio (NR) Release 15 and the NR Release 16 of the third generation partnership project (3GPP), a frequency band up to the upper limit of 52.6 GHz is the target. With regard to extension of the NR to a frequency band higher than or equal to 52.6 GHz, in Release 16, a study item exists at a technical specification group radio access network (TSG RAN) level in which various regulations, use cases, requirements, and the like are examined. The study of the study item was completed in December 2019, and in Release 17, a study item and a work item for actually extending a technical specification to 52.6 GHz or higher have been agreed.

Figure 2:
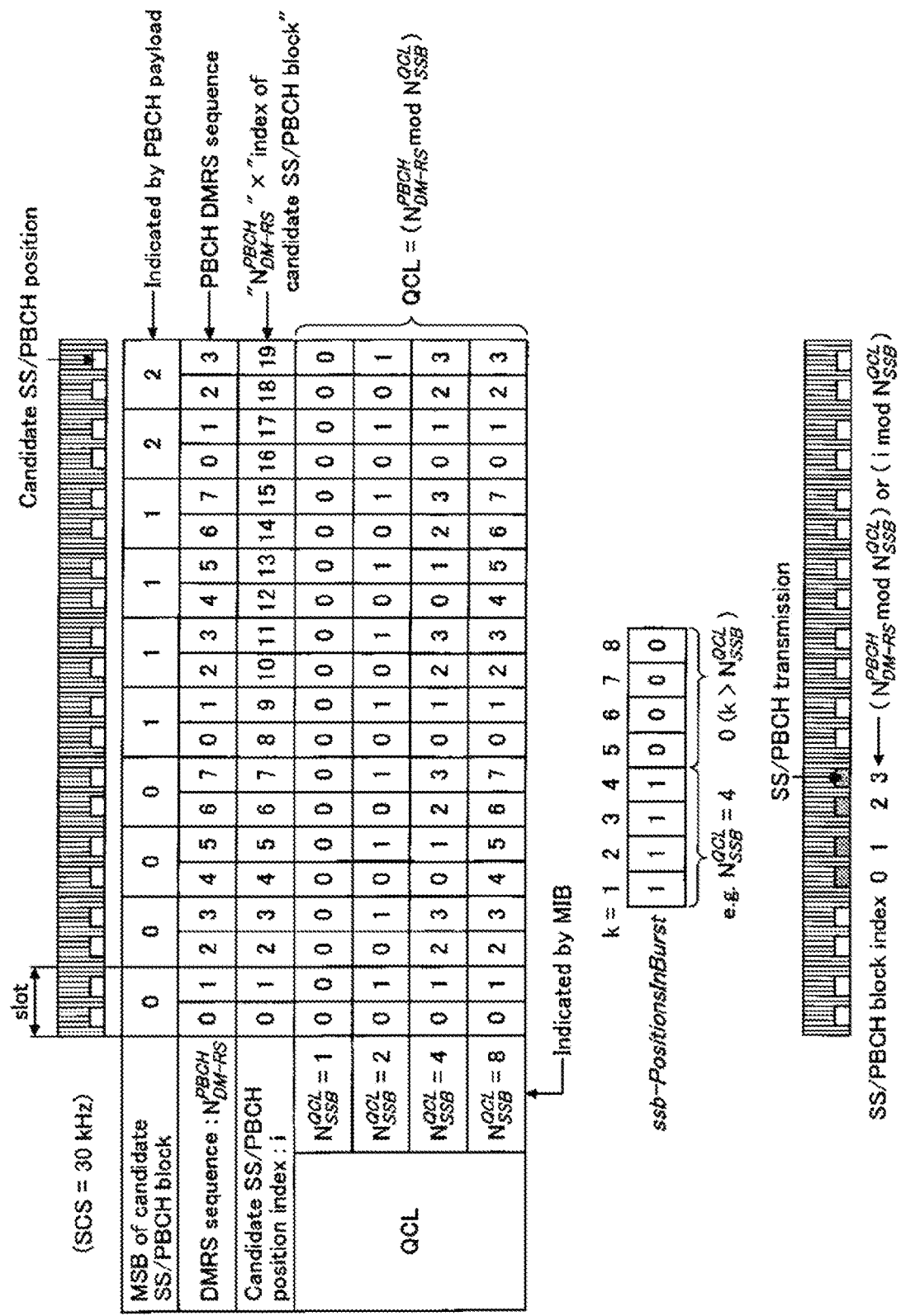
FIG. 2 is a diagram illustrating an example of twenty candidate positions for an SSB transmission.

In the study items in Release 16, as an NR frequency band, extension from 52.6 GHz to 114.25 GHz was assumed, but in Release 17, time for the study is limited, and, thus, it is assumed that the frequency band to be studied is limited to a range from 52.6 GHz to 71 GHz as illustrated in FIG. 2. In addition, when extending the NR frequency band from 52.6 GHz to 71 GHz, it is assumed that extension is carried out on the basis of design of current NR frequency range 2 (FR2). The reason for this is because it is assumed that a considerable amount of time will be spent to conduct an examination on a new wave form.

In addition, the reason for limiting the frequency band to be studied to the range from 52.6 GHz to 71 GHz is as follows. For example, in a frequency band of 71 GHz or lower, a frequency band of 54 GHz to 71 GHz already exists as an unlicensed frequency band available for use in each country. In addition, at a word radio communication conference 2019 (WRC-2019), as a candidate for new frequency band for international mobile telecommunication (IMT), a frequency band from 66 GHz to 71 GHz is the highest frequency band. Thus, no frequency band higher than or equal to 71 GHz is available for use as a licensed band.

Current NR frequency bands include frequency range 1 (FR1), which corresponds to a frequency band of 410 MHz to 7.125 GHz, and FR2, which corresponds to a frequency band of 24.25 GHz to 52.6 GHz.

Note that, with regard to the frequency band of 52.6 GHz to 71 GHz, the definition of the current FR2 (frequency band of 24.25 GHz to 52.6 GHz) may be modified, and the frequency band may be included in a modified FR2, or may be defined as a new frequency range (FR) separately from the FR2.

(Objectives of Work Item)
(RAN1: Feature of Physical Layer)

One or a plurality of new numerologies for the terminal 10 and the base station 20 to operate in a frequency band of 52.6 GHz to 71 GHz. In a case where an influence on a physical signal/channel specified in a study item (SI), a countermeasure is taken for the influence.

Features related to the timeline suitable for each new numerology. For example, preparing time and calculation time for each of bandwidth part (BWP) and beam switching time, hybrid automatic repeat request (HARQ) scheduling, user equipment (UE) processing, physical downlink shared channel (PDSCH), physical uplink shared channel (PUSCH)/sounding reference signal (SRS), and channel state information (CSI).

Up to 64 synchronization signal block (SSB) beams for an operation in a licensed frequency band and an operation in an unlicensed frequency band in a frequency band of 52.6 GHz to 71 GHz.

(RAN1: Physical layer procedure)

A channel access mechanism that assumes a beam-based operation for conforming to regulations and requirements applied to the unlicensed frequency band between 52.6 GHz and 71 GHz.

(RAN4: Core Specifications for Requirements of UE, gNB, and Radio Resource Management (RRM))

Definition of RF core requirements of gNB and UE in a frequency band of 52.6 GHz to 71 GHz. A limited set of a combination of bands is included.

(Outline of SSB)

An SSB is a synchronization signal/broadcast channel block formed of synchronization signals (SS) and a broadcast channel (PBCH). An SSB is periodically transmitted from the base station 20 in order for the terminal 10 to perform detection of a cell ID and reception timing at the time of starting communication. In NR, the SSB is also used to measure the reception quality of each cell.

In the Release 15 NR, the transmission period for transmitting the SSB of a serving cell can be selected. Specifically, the transmission period of the SSB can be selected from among 5 ms, 10 ms, 20 ms, 40 ms, 80 ms, and 160 ms. During initial access, since the terminal 10 has not receive radio resource control (RRC) information or the like, 20 ms is assumed as the transmission period of the SSB. Accordingly, in a cell that is operated in stand-alone for the initial access, it may be assumed that SSBs are transmitted with the transmission period that is less than or equal to 20 ms in many cases.

In addition, for an SSB, a beam index (SS/PBCH block index) that is also used to actually transmit the SSB can be transmitted. The notification of the beam index that is actually used to transmit the SSB can be transmitted by using an information element (IE), such as SSB-PositionsInburst with SIB1 or RRC signaling. In FR1, up to eight SSBs can be transmitted with eight beams corresponding to the SSBs, and, thus, a notification of beam indexes that are actually used for transmitting the SSBs is transmitted by using an 8-bit bit map. In FR2, up to 64 SSBs can be transmitted with 64 beams corresponding to the SSBs, and, thus, in RRC signaling, a notification of beam indexes that are actually used for transmitting the SSBs is transmitted with a 64-bit bit map. However, when the 64-bit bit map is included in SIB1, an overhead increases. Accordingly, in a case where a notification beam indexes of the beams that are actually transmitted is to be transmitted in SIB1, the notification of the beam indexes is transmitted by a total of 16 bits that are an 8-bit bit map and an 8-bit group bit map. Namely, 64 beams corresponding 64 SSBs are divided into a total of eight groups each including eight SSB beams, and a notification of beam indexes of SSBs that are actually transmitted is transmitted by using (i) an 8-bit bit map that indicates which SSB beam in each group is to be transmitted and (ii) another 8-bit bit map for all the groups that indicates a group from among the 8 groups in which the SSB beam is to be transmitted. Furthermore, in FR1 and FR2 excluding an unlicensed frequency, as described below, there is one position per half frame at which an SSB can be transmitted with a beam. Accordingly, a notification of a beam index (SS/PBCH block index) actually used for transmitting an SSB can be interpreted as a notification of a time resource in a half frame in which the SSB is transmitted, so that the beam index can be used for a rate matching during a PDSCH reception.

As an index relating to the SSB, in addition to the above-described beam index (SS/PBCH block index) that is actually used for transmitting the SSB, a candidate SSB position index (Candidate SS/PBCH block index) is defined. The candidate SSB position index is an index that specifies a position at which the SSB can be transmitted with a beam in a half frame. In FR1 excluding an unlicensed frequency, up to eight SSBs can be transmitted by corresponding eight beams, so that it suffices if there is one position in a half frame at which an SSB transmission by using the corresponding beam is possible. Accordingly, by defining the correspondence between the indexes from Number 0 to Number 8 and the SSBs, the candidate SSB position index can be identified. Accordingly, three bits are necessary to identify the candidate SSB position index. Since it is possible to generate eight patterns in the same cell by using sequence patterns for a Demodulation Reference Signal (DMRS) on a Physical Broadcast Channel (PBCH), by using the sequence pattern, the three bits for identifying the candidate SSB position index can be detected.

In FR2, up to 64 SSBs can be transmitted by using the corresponding 64 beams, so that it suffices if there is one position in a half frame at which an SSB transmission by using the corresponding beam is possible. Accordingly, by defining the correspondence between the indexes from Number 0 to Number 63 and the SSBs, the candidate SSB position index can be identified. Accordingly, six bits are necessary to identify the candidate SSB position index. However, if the number of patterns of the PBCH DMRS sequence is increased, DMRS detection performance may deteriorate. Accordingly, eight patterns are specified for the DMRS sequence of the PBCH. The remaining three bits for identifying 64 candidate SSB position indexes are transmitted in a PBCH payload. That is, in FR2, the three least significant bits (LSBs) of the candidate SSB position index are to be detected by the DMRS sequence of the PBCH, and the 3 most significant bits (MSBs) of the candidate SSB position index are to be detected by information transmitted in the PBCH payload.

With respect to measurement based on the SSB in the Release 15 NR, a function (SSB based RRM measurement timing configuration window (SMTC window) configured by an information element SSB-MTC) for transmitting, from the base station 20 to the terminal 10, a notification of a measurement period and measurement timing of the SSB used by the terminal 10 for the measurement has been introduced. The SMTC window is a measurement window that is configured for the terminal 10 by the base station 20 so as to transmit a notification of a measurement start timing, a time interval for the measurement, and a measurement period per cell to be measured when the terminal 10 performs received quality measurement by using the SSB. The period of the SMTC window can be selected from among 5 ms, 10 ms, 20 ms, 40 ms, 80 ms, and 160 ms. In addition, offset granularity of the SMTC window is 1 ms. In addition, duration of the SMTC window can be selected from among 1 ms, 2 ms, 3 ms, 4 ms, and 5 ms. The base station 20 can transmit a notification of a beam index of the SSB to be measured by using information element SSB-ToMeasure. With regard to the FR1, a notification of the beam index of the SSB to be measured can be transmitted by using the 8-bit bit map, and with regard to the FR2, a notification of the beam index of the SSB to be measured can be transmitted by using the 64-bit bit map.

(Function Extension Related to SSB in Release 16 New Radio Unlicensed (NR-U))

NR-U is an unlicensed band, and, thus, it is assumed that the NR-U coexists with other communication systems such as Wi-Fi, another NR-U system, and the like. Accordingly, in the unlicensed frequency band, in a case where the terminal 10 and/or the base station 20 of the NR-U initiates transmission, in order to confirm that another nearby terminal (for example, a terminal corresponding to Wi-Fi 802.11ac method) or another nearby base station (for example, an access point corresponding to Wi-Fi 802.11ac method) in transmission is not present, the terminal 10 and/or the base station 20 of the NR-U is assumed to perform listen before talk (LBT). The LBT is a communication method that performs carrier sensing before initiating transmission, and enables transmission within a predetermined time length only in a case where it is confirmed that a channel is not used by another nearby system.

It is undesirable that a reference signal that is to be used for maintaining cell connection and for measuring a signal quality, such as an SSB, cannot be transmitted due to the LBT. However, it is also undesirable that the SSB can be transmitted in a case where another system is transmitting a signal. Accordingly, a candidate position for an SSB transmission is extended. As in a case where another system is transmitting a signal at a transmission candidate position where the SSB is scheduled to be transmitted, in a case where the SSB cannot be transmitted at the transmission candidate position where the SSB is scheduled to be transmitted, the SSB may be transmitted at a subsequent transmission candidate position. In an unlicensed band of FR1, a subcarrier spacing (SCS) of 15 kHz and an SCS of 30 kHz can be used for an SSB. In the unlicensed band of FR1, in the case of using the SCS of 15 kHz, the candidate position for an SSB transmission is extended to 10 positions. In addition, in the unlicensed band of FR1, in the case of using the SCS of 30 kHz, the candidate position for an SSB transmission is extended to 20 positions. That is, one or more positions at which an SSB transmission by using the corresponding beam is possible exist in a half frame.

For example, as illustrated in FIG. 2, in a case where the SCS is 30 kHz, two candidate positions for an SSB transmission may be configured for each slot in a half frame of 5 ms. The upper limit of the number of the SSBs that can be actually transmitted is set to eight. Among the twenty candidate positions for an SSB transmission illustrated in FIG. 2, the necessary number of SSBs may be transmitted sequentially from a candidate position for an SSB transmission at which the LBT has been successful.

As described above, as an SSB index, an index (for example, a candidate SS/PBCH block index) indicating a position (may be a time domain position, a frequency domain position, or a time and frequency domain position) at which the SSB is to be transmitted, and an index (SS/PBCH block index) indicating a beam with which the corresponding SSB is transmitted may be defined.

For example, as illustrated in FIG. 2, in a case where the SCS is 30 kHz, suppose that twenty candidate positions for an SSB transmission (time domain positions) are configured. In the example in FIG. 2, the twenty transmission candidate positions are indicated by the candidate SS/PBCH block index. The candidate SS/PBCH block index is information necessary for determining the timing within 5 ms at which the terminal detects the SSB, i.e., information necessary for the terminal 10 to determine a frame timing.

In addition, in the example in FIG. 2, information necessary to derive an index (SS/PBCH block index) indicating the beam from among up to 8 beams with which the SSB is transmitted, i.e., quasi co-location (QCL) information is attached to each transmission candidate position. For example, when the terminal 10 reports quality per beam to the base station 20, the QCL information may be used.

In the example in FIG. 2, in a case where the SCS is 30 kHz, ten slots are included within 5 ms, and two candidate positions for an SSB transmission are included per slot. Candidate SS/PBCH block indexes from 0 to 19 are sequentially attached to the twenty candidate positions for an SSB transmission from the start.

In this case, since eight patterns can be used as the PBCH DMRS sequence, indexes from 0 to 7 can be attached to the candidate position for an SSB transmission by using the patterns of the PBCH DMRS sequence. In the example in FIG. 2, DMRS sequences from 0 to 7 correspond to the candidate positions for an SSB transmission with the candidate SS/PBCH block indexes from 0 to 7, and the DMRS sequences 0 to 7 corresponds to the candidate positions for an SSB transmission with the candidate SS/PBCH block indexes from 8 to 15, and the DMRS sequences 0 to 3 correspond to the candidate positions for an SSB transmission with the candidate SS/PBCH block indexes from 16 to 19. Namely, the correspondence is defined such that a DMRS sequence of a PBCH to be used is uniquely determined by specifying a candidate position for transmitting an SSB.

In addition, as illustrated in the example in FIG. 2, when information on the bits corresponding to MSBs of the candidate SS/PBCH block index transmitted by the PBCH payload is obtained, it is possible to uniquely determine the candidate SS/PBCH block index by the MSBs and the DMRS sequence. Note that, in the example in FIG. 2, the base station 20 may directly transmit, to the terminal 10, a notification of the candidate SS/PBCH block index. For example, the base station 20 may transmit information on the bits corresponding to the MSBs of the candidate SS/PBCH block index, and the PBCH DMRS to the terminal 10, and the terminal 10 may derive the candidate SS/PBCH block index based on the bit information corresponding to the MSBs of the candidate SS/PBCH block index and the PBCH DMRS sequence.

In addition, in the example in FIG. 2, in a case where the number of beams transmitted by the base station 20 is eight, the beams are repeated per eight candidate positions for an SSB transmission. In the example in FIG. 2, SS/PBCH block indexes from 0 to 7 correspond to the candidate positions for an SSB transmission with the candidate SS/PBCH block indexes from 0 to 7, SS/PBCH block indexes from 0 to 7 correspond to the candidate positions for an SSB transmission with the candidate SS/PBCH block indexes from 8 to 15, and SS/PBCH block indexes from 0 to 3 correspond to the candidate positions for an SSB transmission with the candidate SS/PBCH block indexes from 16 to 19.

For example, the window of 5 ms illustrated in FIG. 2 is configured per transmission period of 20 ms for an SSB, in which there are twenty candidate positions for the SSB transmission, and the candidate transmission position at which the SSB is to be transmitted depends on the transmission period of 20 ms for the SSB. For example, QCL information is necessary so as to determine that a beam used for a transmission of an SSB detected at a position where the candidate SS/PBCH block index is 0 in the SSB transmission period of 20 ms is the same as a beam used for another transmission of another SSB detected at a position where the candidate SS/PBCH block index is 4 in the subsequent SSB transmission period of 20 ms. In a case where eight QCLs exist, since eight beams are repeated, a beam used in transmission of an SSB detected at a position where the candidate SS/PBCH block index is 0, and a beam used in transmission of an SSB detected at a position where the candidate SS/PBCH block index is 4 in the subsequent SSB transmission period of 20 ms are different from each other (that is, the SS/PBCH block indexes are different from each other). In addition, beams used in transmissions of SSBs at positions where the candidate SS/PBCH block indexes are 0, 8, and 16 are the same (that is, the same SS/PBCH block indexes).

In addition, in the example in FIG. 2, in a case where the base station 20 transmits, to the terminal 10, a notification of four as a QCL parameter, four beams are to be used. In this case, the correspondence is such that the beams with beam indexes 0, 1, 2, and 3 are used for transmissions of SSBs at positions with the candidate SS/PBCH block indexes from 0 to 3. In this case, the beams used in the transmissions of the SSBs at positions with the candidate SS/PBCH block indexes 0 and 4 are the same (that is, the same SS/PBCH block indexes). For example, a beam used to transmit an SSB detected at a position with the candidate SS/PBCH block index 0 in an SSB transmission period is determined to be the same as a beam used to transmit an SSB detected at a position with the candidate SS/PBCH block index 4 in another SSB transmission period, and beam quality can be measured, for example, by averaging these.

Note that, a notification of a QCL parameter may be transmitted in the PBCH payload.

In addition, in the case of the NR-U, the number of the candidate positions for an SSB transmission is twenty, and an actual SSB transmission position may be different per SSB transmission period due to a result of the LBT, and, thus, it may not be possible to use ssb-PositionsInBurst to indicate the transmission candidate position at which the SSB beam is to be transmitted. However, by the ssb-PositionsInBurst, it is possible to indicate the number of SSBs to be transmitted and the patterns with which the SSBs are to be transmitted.

Figure 3:
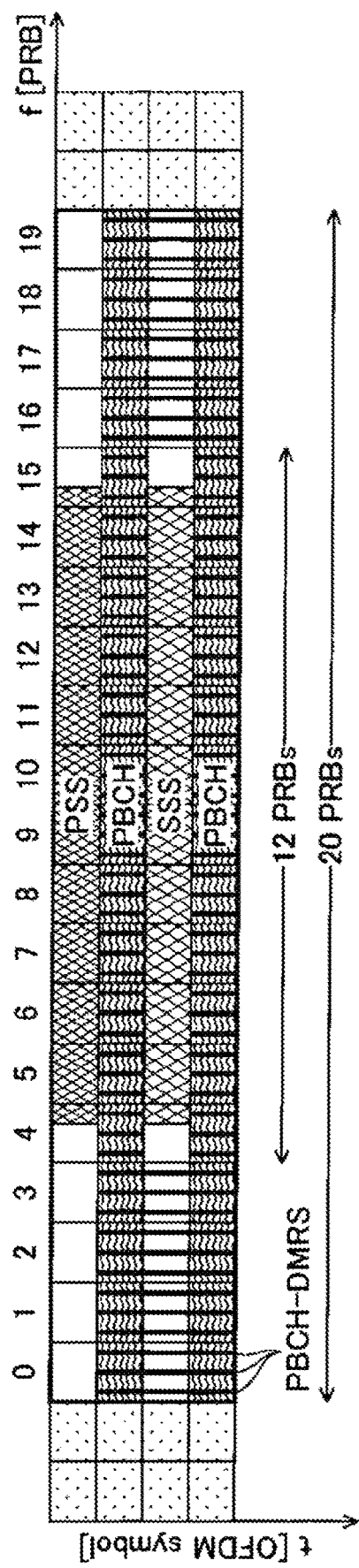
FIG. 3 is a diagram illustrating an example of an SSB resource mapping structure introduced in NR of Release 15.

FIG. 3 is a diagram illustrating an example of an SSB resource mapping structure introduced in the Release 15 NR. The SSB resource mapping structure is also adopted for NR-U of Release 16, and it is assumed that the SSB resource mapping illustrated in FIG. 3 is adopted for a frequency band of 52.6 GHz to 71 GHz, which has been studied in the Release 17 NR.

In the following, an example is illustrated in which four symbols of an SSB in the time direction are mapped onto symbols in a slot and a slot including a candidate position for an SSB transmission is mapped to a slot in a time unit, such as 5 ms. In Release 15, the five cases, which are Cases A, B, C, D, and E, are defined, as the mapping.

Figure 4:
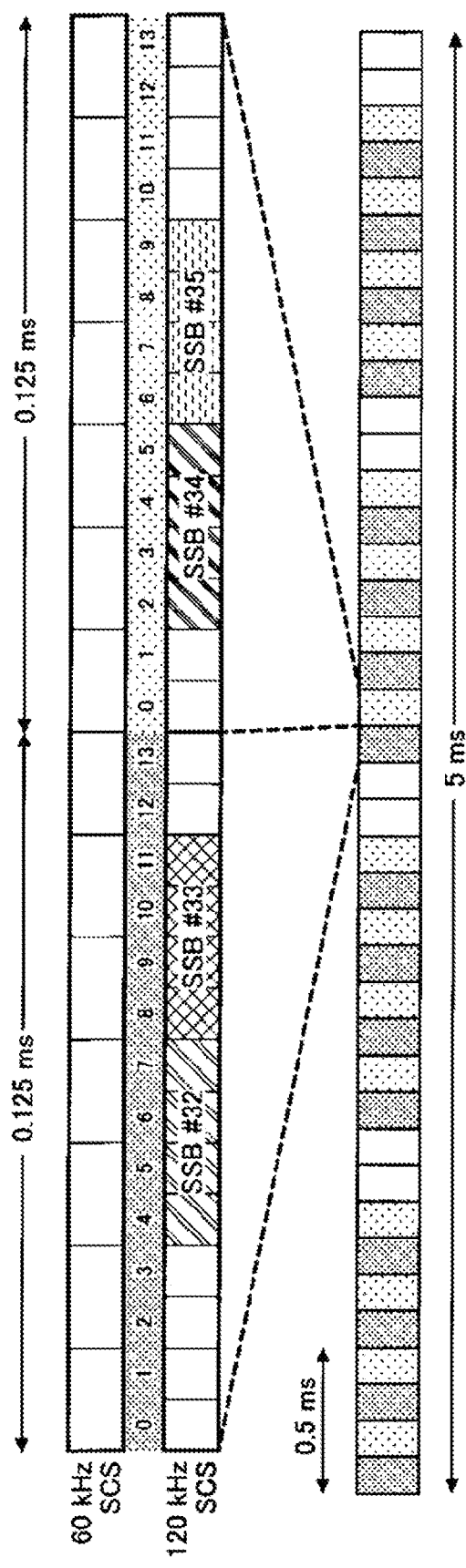
FIG. 4 is a diagram illustrating an example of an SSB burst structure case D in FR2 of Release 15 NR.

FIG. 4 is a diagram illustrating an example of the SSB burst structure case D in the FR2 of Release 15 NR. In the example of FIG. 4, the SCS is 120 kHz. In the example of FIG. 4, two SSBs are mapped to be adjacent to each other in a slot of 120 kHz. A pattern in which no SSB is mapped onto the four start symbols and onto the two end symbols and a pattern in which no SSB is mapped onto the two start symbols and the four end symbols are alternately repeated between two continuous slots. The patterns are repeated in a length corresponding to eight slots, and two slots that do not include an SSB are placed. Sixty four candidate positions for an SSB transmission are configured by repeating the patterns.

Figure 5:
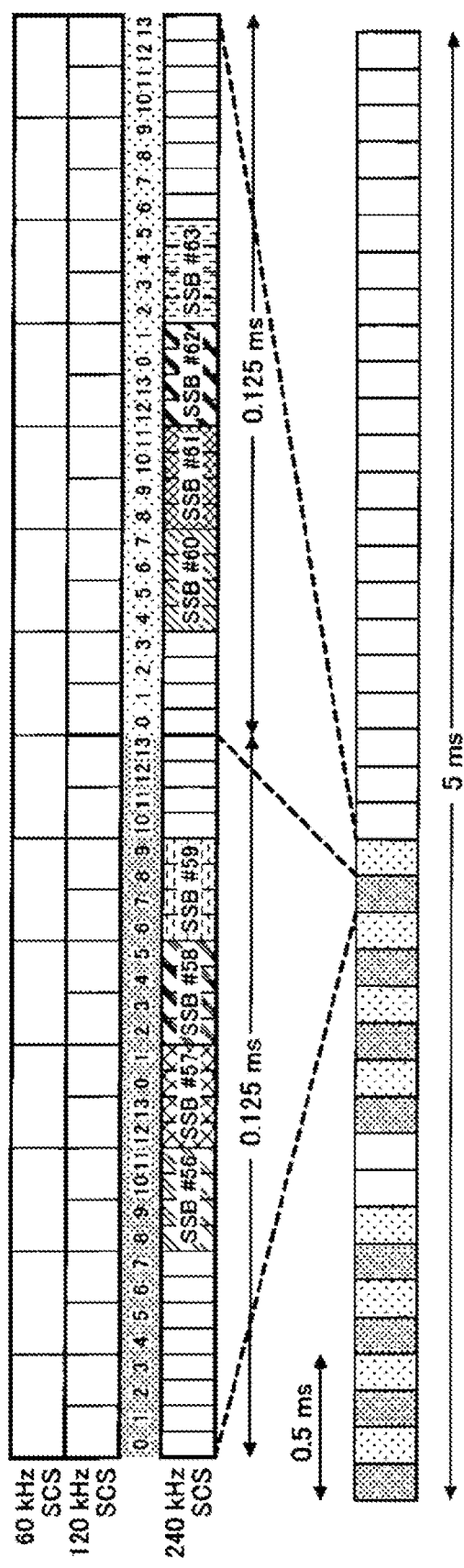
FIG. 5 is a diagram illustrating an example of an SSB burst structure case E in the FR2 of Release 15 NR.

FIG. 5 is a diagram illustrating an example of the SSB burst structure case E in the FR2 of Release 15 NR. In the example in FIG. 5, the SCS is 240 kHz. In this case, the SCS of the SSB is 240 kHz. However, the SCS of 240 kHz cannot be used for data and control channels, and an SCS of 60 kHz or an SCS of 120 kHz is used for the data and control channels. In the example in FIG. 5, four SSBs are mapped to be adjacent to each other in a slot of 120 kHz (for the data). A pattern in which no SSB is mapped onto the eight start symbols and onto the four end symbols and a pattern in which no SSB is mapped onto the four start symbols and eight end symbols are alternately repeated between two continuous slots of 120 kHz. After the patterns are repeated in a length corresponding to eight slots of 120 kHz, two slots of 120 kHz that do not include an SSB are placed. Sixty four candidate positions for an SSB transmission are configured by repeating the patterns.

Figure 6:
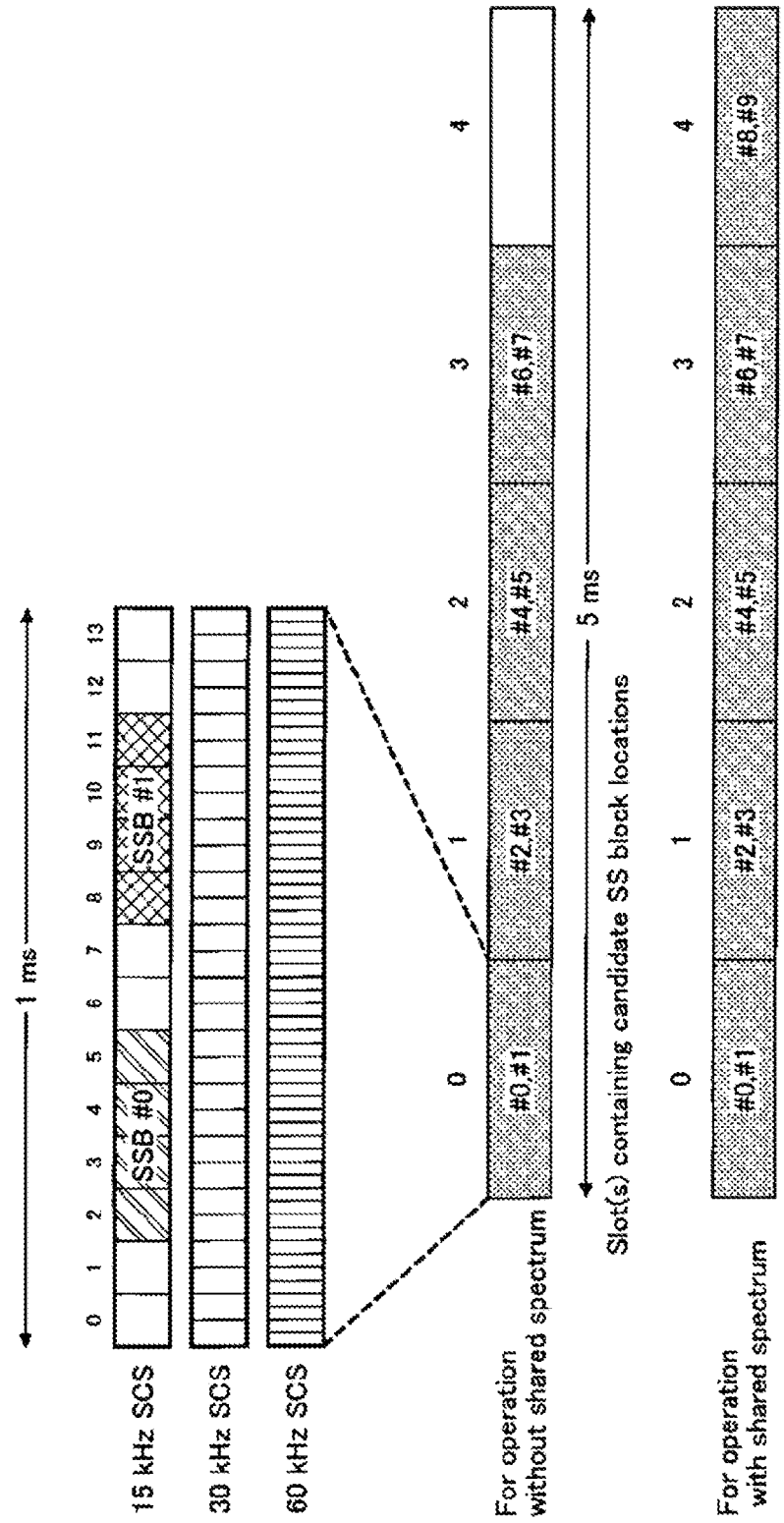
FIG. 6 is a diagram illustrating an example of an SSB burst structure case A in the FR1 of Release 15 NR.

FIG. 6 is a diagram illustrating an example of the SSB burst structure case A in the FR1 of Release 15 NR. In the example in FIG. 6, the SCS is 15 kHz. In the example in FIG. 6, in one slot, no SSB is mapped onto the two start symbols, a first SSB is mapped onto the subsequent four symbols, no SSB is mapped onto the subsequent two symbols, a second SSB is mapped onto the subsequent four symbols, and no SSB is mapped onto the subsequent two symbols. In a licensed band in the FR1 of Release 15 NR, eight candidate positions for an SSB transmission are configured by continuously arranging the four slot patterns. In addition, in an unlicensed band in the FR1 of Release 15 NR, ten candidate positions for an SSB transmission are configured by continuously arranging the five slot patterns.

Figure 7:
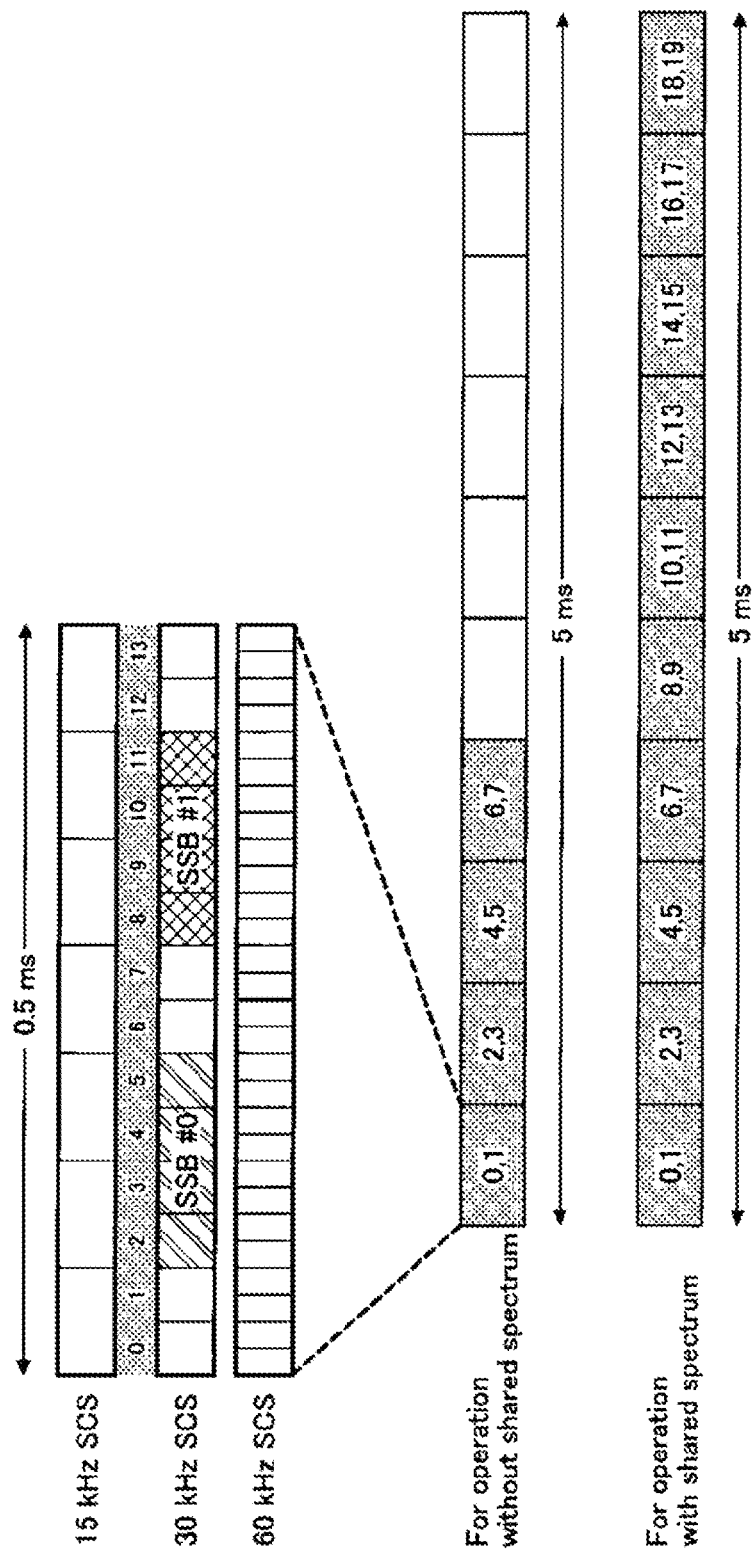
FIG. 7 is a diagram illustrating an example of an SSB burst structure case C in the FR1 of Release 15 NR.

FIG. 7 is a diagram illustrating an example of the SSB burst structure case C in the FR1 of Release 15 NR. In the example in FIG. 7, the SCS is 30 kHz. In the example in FIG. 7, in one slot, no SSB is mapped onto the two start symbols, a first SSB is mapped onto the subsequent four symbols, no SSB is mapped onto the subsequent two symbols, a second SSB is mapped onto the subsequent four symbols, and no SSB is mapped onto the subsequent two symbols. In a licensed band in the FR1 of Release 15 NR, eight candidate positions for an SSB transmission are configured by continuously arranging the four slot patterns. In addition, in an unlicensed band in the FR1 of Release 15 NR, twenty candidate positions for an SSB transmission are configured by continuously arranging the ten slot patterns.

(Problem)

Since a frequency band from 52.6 GHz to 71 GHz includes an unlicensed band of 60 GHz, the NR system may share the unlicensed band of 60 GHz with another system (for example, WiGig (IEEE802.11ad/ay)). Accordingly, the terminal 10 and/or the base station 20 is assumed to perform Listen Before Talk (LBT) such that carrier sensing is performed before starting a transmission and a transmission is performed in a predetermined time length only if it is confirmed that a channel is not used by another nearby system. In this case, a transmission of an SSB may be unable to be performed.

It is undesirable that a reference signal that is to be used for maintaining cell connection and for measuring a signal quality, such as an SSB, cannot be transmitted due to the LBT. However, it is also undesirable that the SSB can be transmitted in a case where another system is transmitting a signal. Accordingly, it is considered to extend the candidate positions for an SSB transmission in a frequency band from 52.6 GHz to 71 GHz. As in a case where another system is transmitting a signal at a transmission candidate position where the SSB is scheduled to be transmitted, in a case where the SSB cannot be transmitted at the transmission candidate position where the SSB is scheduled to be transmitted, the SSB may be transmitted at a subsequent transmission candidate position.

Currently, up to 64 SSB beams are assumed to be supported in the frequency band from 52.6 GHz to 71 GHz. However, in a case where an SSB cannot be transmitted at a transmission candidate position at which the SSB is scheduled to be transmitted, it is unclear whether the SSB can be transmitted at the subsequent transmission candidate position.

In addition, in the frequency band from 52.6 GHz to 71 GHz, it is assumed that a new numerology is introduced, but it is unclear that how many SCSs are supported as the SCSs of the SSB, and, thus, it is also unclear whether a new SCS is the same as or different from the SCS (120/240 kHz SCS) of current FR2.

In the frequency band from 52.6 GHz to 71 GHz, in a case where an SSB cannot be transmitted at a transmission candidate position where the SSB is scheduled to be transmitted, in order to allow the SSB to be transmitted at the subsequent transmission candidate position, it is considered that it is necessary to introduce an operation of detecting an index of a candidate position for an SSB transmission for synchronization with frame timing, and/or an operation of deriving the QCL for determining a beam index. For example, a change in the interpretation of a PBCH payload bit and/or a modification of the expectation of the terminal 10 may be necessary.

In addition, a licensed frequency band may be included in the frequency band from 52.6 GHz to 71 GHz. In the licensed frequency band, since collision with a transmission by another system is not assumed, a functional extension as in the case of the NR-u may be unnecessary.

Accordingly, as a functional extension for the frequency band from 52.6 GHz to 71 GHz, a functional extension for a licensed frequency band and a functional extension for an unlicensed frequency may be necessary.

(Proposal)

In the frequency band from 52.6 GHz to 71 GHz, SSB transmission with efficiency and high reliability is enabled with a minimum change from the FR2 technical specification.

In the case of an operation of the licensed frequency band included in the frequency band from 52.6 GHz to 71 GHz, a candidate position for an SSB transmission in a slot may be defined based on a possible combination of SCS of the SSB and SCS of the PDCCH/PDSCH.

In the case of an operation of an unlicensed frequency band included in the frequency band from 52.6 GHz to 71 GHz, a plurality of candidate positions for an SSB transmission may be configured for each SSB beam.

In the case of the operation of the unlicensed frequency band included in the frequency band from 52.6 GHz to 71 GHz, indexes of the candidate positions for an SSB transmission may be from 0 to 63, and, as in the case of the FR2 of Release 15 NR, an index of the candidate position for an SSB transmission may be derived from the PBCH DMRS sequence and the PBCH payload. Note that, the index of the candidate position for an SSB transmission may be derived from a combination of the PBCH sequence, the DMRS sequence, and the PBCH payload (for example, a combination of the PBCH sequence and the PBCH payload).

In the case of the operation of the unlicensed frequency band included in the frequency band from 52.6 GHz to 71 GHz, the SSB index may be from 0 to 63, and may be derived from an index of the candidate position for an SSB transmission and a QCL parameter in the PBCH payload. In addition, the number of candidate values of the QCL parameter capable of being transmitted in the frequency band may be different from that of another frequency band (for example, the number of the candidate values in the frequency band of the NR-U may be less than or greater than 4). Note that, the terminal 10 may receive, from the base station 20, information indicating the slot in the window that includes the candidate position for an SSB transmission.

In the case of the operation of the unlicensed frequency band included in the frequency band from 52.6 GHz to 71 GHz, the maximum duration of the discovery burst transmission window may be 5 ms (for example, may be 2 ms if the SCS is 240 kHz), and each slot in the window may include a candidate position for an SSB transmission. Note that, in the case of the operation of the unlicensed frequency band, the terminal 10 may expect that a transmission of an SSB in a half frame is within the discovery burst transmission window. The discovery burst transmission window starts from the first symbol of the first slot in the half frame. The base station 20 can configure a time length of the discovery burst transmission window for the terminal 10 per serving cell by an information element, DiscoveryBurst-WindowLength-r16. If the information element, DiscoveryBurst-WindowLength-r16, is not provided, the terminal 10 may assume (determine) that the time length of the discovery burst transmission window is the half frame. The discovery burst is a downlink transmission burst that is limited to the window and includes a set of a signal and/or a channel which is associated with a duty cycle. In addition, for example, the discovery burst may be a transmission from the base station 20 including an SSB, which is formed of a primary synchronization signal (PSS), a secondary synchronization signal (SSS), a physical broadcast channel (PBCH), and a demodulation reference signal (DM-RS) associated with the PBCH.

In the case of the operation of the unlicensed frequency band included in the frequency band from 52.6 GHz to 71 GHz, the terminal 10 may assume (determine) that the SCS of the SSB is the same as that of SIB1 PDCCH/PDSCH (alternatively, the SCS of the SSB may be assumed to be two times that of the SIB1 PDCCH/PDSCH).

(Licensed Frequency Band Included in Frequency Band from 52.6 GHz to 71 GHz)

For the licensed frequency band included in the frequency band from 52.6 GHz to 71 GHz, a candidate position for an SSB transmission in a slot may be determined based on a possible combination of SCS of the SSB and the PDCCH/PDSCH SCS.

(Option 1)

A combination of the SCS of the SSB and the PDCCH/PDSCH SCS may be limited to a case where the SCS of the SSB and the SCS of the PDCCH/PDSCH are the same.

Figure 8:
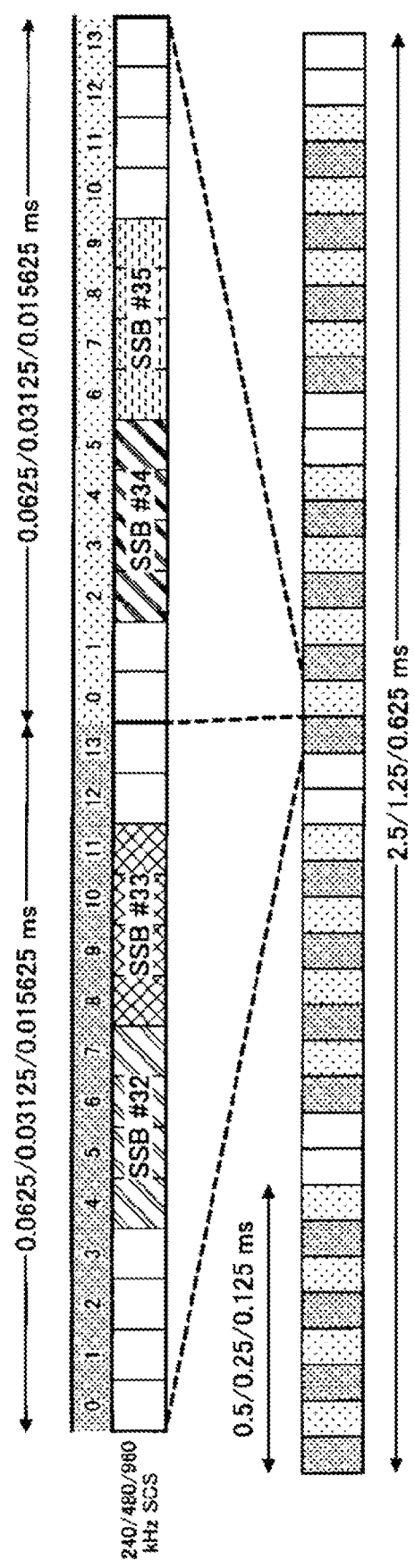
FIG. 8 is a diagram illustrating Example 1-1 of a candidate position for an SSB transmission in a slot.

FIG. 8 is a diagram illustrating Example 1-1 of a candidate position for an SSB transmission in a slot. In the example in FIG. 8, the configuration of Case D illustrated in FIG. 4 is reused. The number of symbols per slot may be 14. For example, 240 kHz, 480 kHz, and 960 kHz may be supported as the SCS of the SSB and the SCS of the PDCCH/PDSCH. In the example in FIG. 8, in cases where 240 kHz, 480 kHz, and 960 kHz are supported as the SCS of the SSB and the SCS of the PDCCH/PDSCH, the configuration of Case D illustrated in FIG. 4 is applied. In the example in FIG. 8, if the SCS is 240 kHz, a slot length is 0.0625 ms, if the SCS is 480 kHz, a slot length is 0.03125 ms, and if the SCS is 960 kHz, a slot length is 0.01526 ms.

In the example in FIG. 8, two SSBs are mapped to be adjacent to each other in the slot. A pattern in which no SSB is mapped onto the four start symbols and onto the two end symbols and a pattern in which no SSB is mapped onto the two start symbols and onto the four end symbols are alternately repeated between two continuous slots. After the patterns are repeated in a length corresponding to eight slots, two slots that do not include an SSB are placed. Sixty four candidate positions for an SSB transmission are configured by repeating the patterns.

Figure 9:
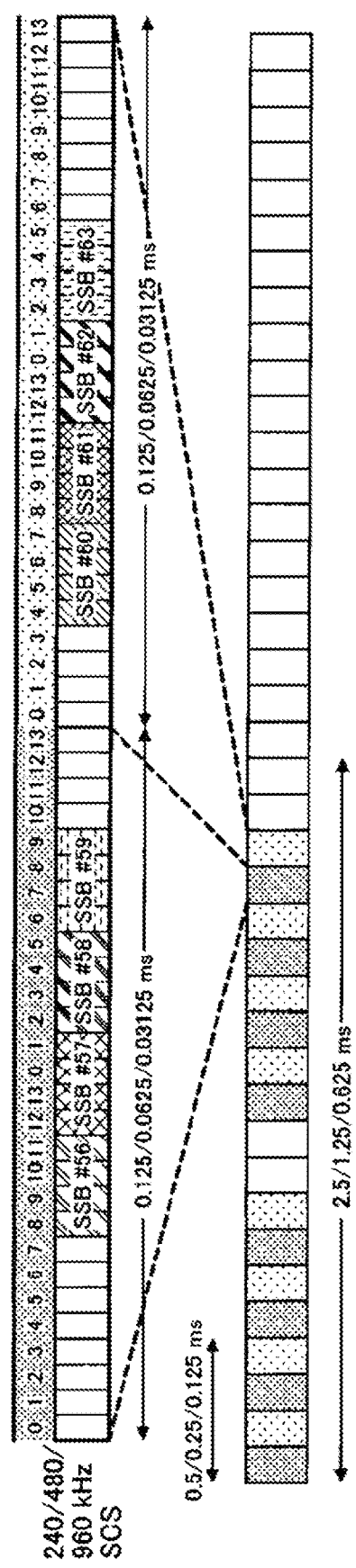
FIG. 9 is a diagram illustrating Example 1-2 of the Candidate position for an SSB transmission in the slot.

FIG. 9 is a diagram illustrating Example 1-2 of a candidate position for an SSB transmission in a slot. In the example illustrated in FIG. 9, the configuration of Case E illustrated in FIG. 5 is reused. The number of symbols per slot may be 28. For example, 240 kHz, 480 kHz, and 960 kHz may be supported as the SCS of the SSB and the SCS of the PDCCH/PDSCH. In the example in FIG. 9, in cases where 240 kHz, 480 kHz, and 960 kHz are supported as the SCS of the SSB and the SCS of the PDCCH/PDSCH, the configuration of Case E illustrated in FIG. 5 is applied. In the example in FIG. 9, if the SCS is 240 kHz, a slot length is 0.125 ms, if the SCS is 480 kHz, a slot length is 0.0625 ms, and if the SCS is 960 kHz, a slot length is 0.3125 ms. In the example in FIG. 9, four SSBs are mapped to be adjacent to each other in the slot. A pattern in which no SSB is mapped onto the eight start symbols and the four end symbols, and a pattern in which no SSB is mapped onto the four start symbols and the eight end symbols are alternately repeated between two continuous slots. After the patterns are repeated in a length corresponding to eight slots, two slots that do not include an SSB are placed. Sixty four candidate positions for an SSB transmission are configured by repeating the patterns.

Figure 10:
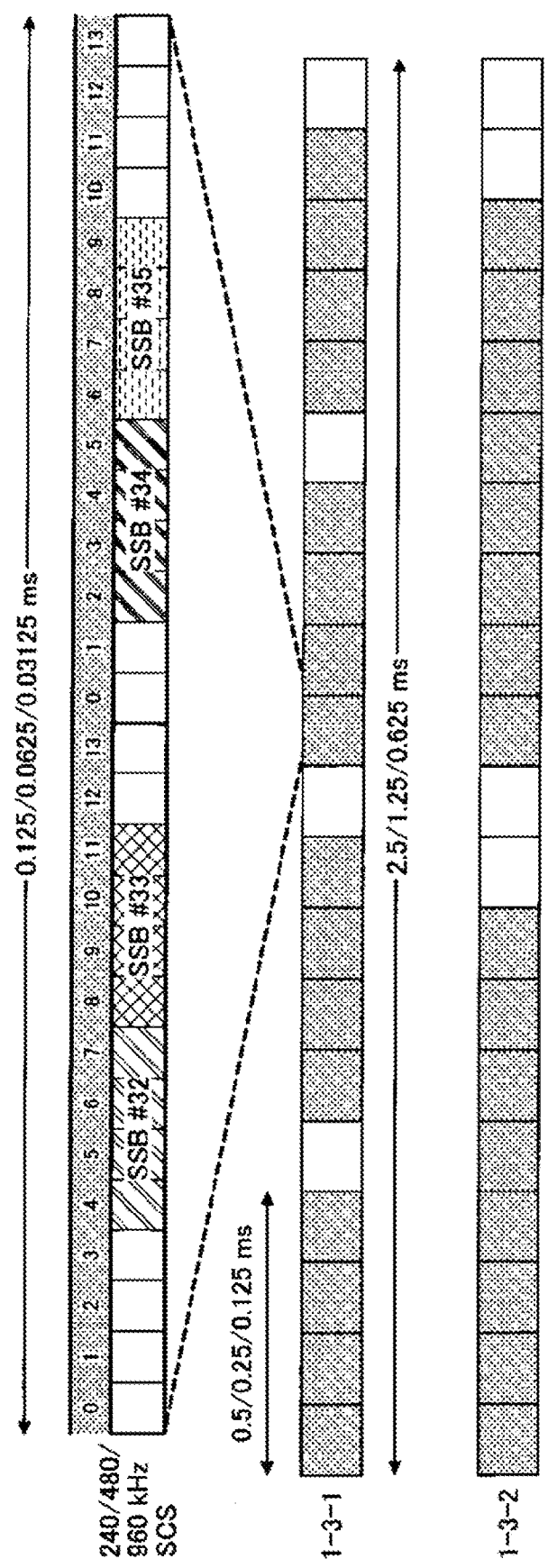
FIG. 10 is a diagram illustrating Example 1-3 of the candidate position for an SSB transmission in the slot.

FIG. 10 is a diagram illustrating Example 1-3 of a candidate position for an SSB transmission in a slot. In the example in FIG. 10, the configuration of Case D illustrated in FIG. 4 is applied to a case where the number of symbols per slot is 28. For example, 240 kHz, 480 kHz, and 960 kHz may be supported as the SCS of the SSB and the SCS of the PDCCH/PDSCH. In the example in FIG. 10, if the SCS is 240 kHz, a slot length is 0.125 ms, if the SCS is 480 kHz, a slot length is 0.0625 ms, and if the SCS is 960 kHz, a slot length is 0.03125 ms. In the example in FIG. 10, in one slot, no SSB is mapped onto the four start symbols, a first SSB is mapped onto the subsequent four symbols, a second SSB is mapped onto the subsequent four symbols, no SSB is mapped onto the subsequent four symbols, a third SSB is mapped onto the subsequent four symbols, a fourth SSB is mapped onto the subsequent four symbols, and no SSB is mapped onto the subsequent four symbols.

In Example 1-3-1 illustrated in FIG. 10, as described above, sixty four candidate positions for an SSB transmission are configured by repeating a pattern in which one slot in which no candidate position for an SSB transmission is mapped is placed after four slots are continued, in each of which a candidate position for an SSB transmission is mapped.

In Example 1-3-2 illustrated in FIG. 10, as described above, sixty four candidate positions for an SSB transmission are configured by repeating a pattern in which two slots in which no candidate position for an SSB transmission is mapped are placed after eight continuous slots, in each of which a candidate position for an SSB transmission is mapped.

In addition, as Example 1-4, the configuration of Case C illustrated in FIG. 7 may be applied to a case where the number of symbols per slot is 14.

In addition, as Example 1-5, the configuration of Case C illustrated in FIG. 7 may be applied to a case where the number of symbols per slot is 28.

In addition, as Example 1-6, any one configuration among those of Example 1-1 to Example 1-5 may be applied per SCS. For example, Example 1-1 or Example 1-4 may be applied to a case where the SCS is 240 kHz (case where the number of symbols per slot is 14). In addition, for example, Example 1-2, Example 1-3, or Example 1-4 may be applied to a case where the SCS is 480 kHz or 960 kHz (case where the number of symbols per slot is 28).

(Option 2)

The combination of the SCS of the SSB and the PDCCH/PDSCH SCS may be limited to 1) a case where the SCS of the SSB and the SCS of the PDCCH/PDSCH are the same, and/or 2) a case where the SCS of the SSB is two times the SCS of the PDCCH/PDSCH. Note that, the embodiments are not limited to a case where the SCS of the SSB is twice the SCS of the PDCCH/PDSCH, and for example, the SCS of the SSB may be 1/2 times, 3/2 times, or three times the SCS of the PDCCH/PDSCH.

Figure 11:
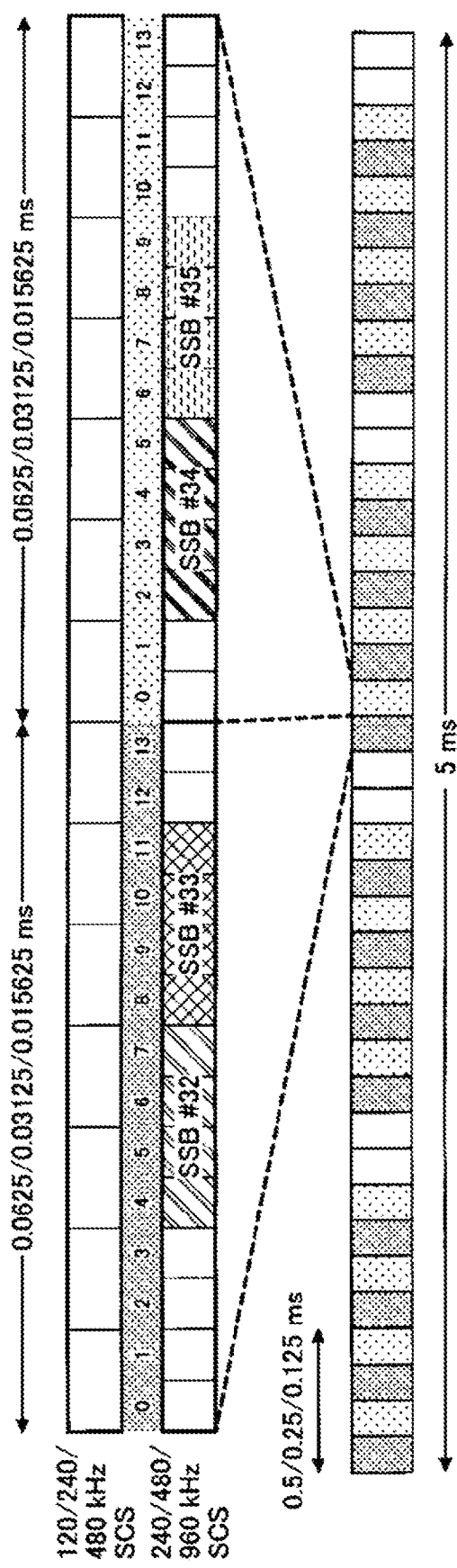
FIG. 11 is a diagram illustrating Example 2-1 of the candidate position for an SSB transmission in the slot.

FIG. 11 is a diagram illustrating Example 2-1 of a candidate position for an SSB transmission in a slot. In the example in FIG. 11, the configuration of Case D illustrated in FIG. 4 is reused. The number of symbols per slot may be 14. For example, 120 kHz, 240 kHz, and 480 kHz may be supported as the SCS of the PDCCH/PDSCH, and 240 kHz, 480 kHz, and 960 kHz may be supported as a corresponding SCS of the SSB. In the example in FIG. 11, if the SCS is 240 kHz, a slot length is 0.0625 ms, if the SCS is 480 kHz, a slot length is 0.03125 ms, and if the SCS is 960 kHz, a slot length is 0.01526 ms. In the example in FIG. 11, two SSBs are mapped to be adjacent to each other in the slot. A pattern in which no SSB is mapped onto the four start symbols and the two end symbols, and a pattern in which no SSB is mapped onto the two start symbols and the four end symbols are alternately repeated between two continuous slots. After the patterns are repeated in a length corresponding to eight slots, two slots that do not include an SSB are placed. Sixty four candidate positions for an SSB transmission are configured by repeating the patterns.

Figure 12:
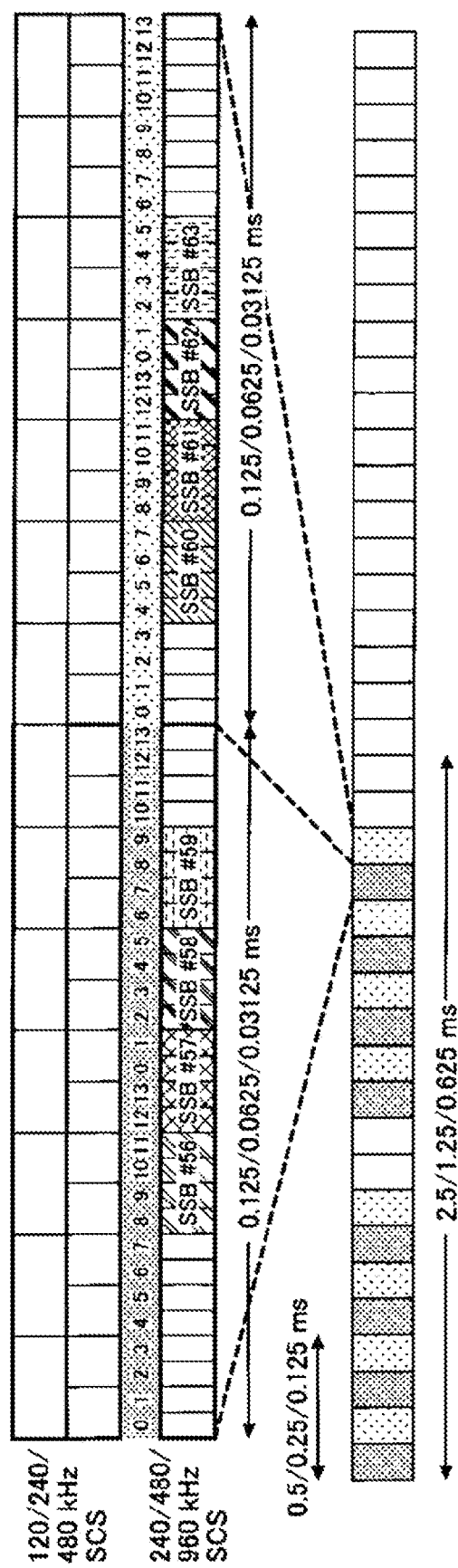
FIG. 12 is a diagram illustrating Example 2-2 of the candidate position for an SSB transmission in the slot.

FIG. 12 is a diagram illustrating Example 2-2 of a candidate position for an SSB transmission in a slot. In the example in FIG. 12, the configuration of Case E illustrated in FIG. 5 is reused. The number of symbols per slot may be 14. For example, 120 kHz, 240 kHz, and 480 kHz may be supported as the SCS of the PDCCH/PDSCH, and 240 kHz, 480 kHz, and 960 kHz may be supported as a corresponding SCS of the SSB. In the example in FIG. 12, if the SCS of the SSB is 240 kHz, a slot length is 0.125 ms, if the SCS of the SSB is 480 kHz, a slot length is 0.0625 ms, and if the SCS of the SSB is 960 kHz, a slot length is 0.03125 ms. In the example in FIG. 12, four SSBs are mapped to be adjacent to each other in the slot. A pattern in which no SSB is mapped onto the eight start symbols and the four end symbols, and a pattern in which no SSB is mapped onto the four start symbols and the eight end symbols are alternately repeated between two continuous slots. After the patterns are repeated in a length corresponding to eight slots, two slots that do not include an SSB are placed. Sixty four candidate positions for an SSB transmission are configured by repeating the patterns.

In addition, as Example 2-3, the configuration of Case D illustrated in FIG. 4 may be applied to a case where the number of symbols per slot is 28.

In addition, as Example 2-4, the configuration of Case E illustrated in FIG. 5 may be applied to a case where the number of symbols per slot is 28.

In addition, as Example 2-5, the configuration of Case C illustrated in FIG. 7 may be applied to a case where the number of symbols per slot is 14.

In addition, as Example 2-5, the configuration of Case C illustrated in FIG. 7 may be applied to a case where the number of symbols per slot is 28.

In addition, as Example 2-7, any one configuration among those of Example 2-1 to Example 2-6 may be applied per SCS. For example, Example 2-1, Example 2-2, or Example 2-5 may be applied to a case where the SCS of the SSB is 240 kHz (case where the number of symbols per slot is 14). In addition, for example, Example 2-3, Example 2-4, or Example 2-6 may be applied to a case where the SCS of the SSB is 480 kHz or 960 kHz (case where the number of symbols per slot is 28).

(Option 3)

Different options between the above-described Option 1 and Option 2 may be applied to different SCSs. For example, Option 1 may be applied to a case where the SCS of the SSB is 240 kHz (case where the SCS of the SSB and the SCS of the PDCCH/PDSCH are the same as each other), and Option 2 may be applied to a case where the SCS of the SSB is 480 kHz or 960 kHz (case where the SCS of the SSB is two times the PDCCH/PDSCH).

(Unlicensed Frequency Band Included in Frequency Band from 52.6 GHz to 71 GHz)

In an unlicensed frequency band included in a frequency band from 52.6 GHz to 71 GHz, the terminal 10 and/or the base station 20 may perform the listen before talk (LBT) such that carrier sensing is performed before starting transmission and transmission is performed within a predetermined time length only if it is confirmed that a channel is not used by other nearby systems.

In the case of an operation of the unlicensed frequency band included in the frequency band from 52.6 GHz to 71 GHz, indexes of candidate positions for an SSB transmission may be from 0 to 63, and, as in the case of the FR2 of Release 15 NR, an index of a candidate position for an SSB transmission may be derived from the PBCH DMRS sequence and the PBCH payload.

In the case of the operation of the unlicensed frequency band included in the frequency band from 52.6 GHz to 71 GHz, a candidate position for an SSB transmission in a slot may be based on the configuration of Case C illustrated in FIG. 7, the configuration of Case D illustrated in FIG. 4, or the configuration of Case E illustrated in FIG. 5 (may be the same as or different from the configuration in the case of the licensed frequency band included in the frequency band from 52.6 GHz to 71 GHz).

In the case of the operation of the unlicensed frequency band included in the frequency band from 52.6 GHz to 71 GHz, mapping of a slot including a candidate position for an SSB transmission may be different from mapping of a slot including a candidate position for an SSB transmission in the case of the operation of the licensed frequency band included in the frequency band from 52.6 GHz to 71 GHz.

Figure 13:
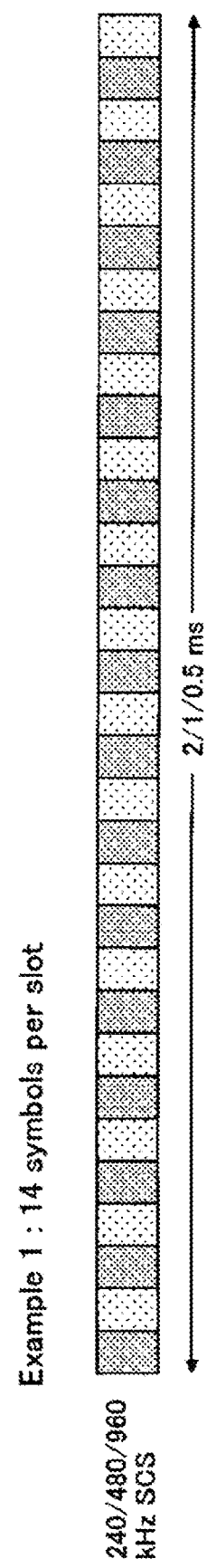
FIG. 13 is a diagram illustrating an example of mapping of a slot including the candidate position for an SSB transmission in an unlicensed frequency band included in a frequency band from 52.6 GHz to 71 GHz.

FIG. 13 is a diagram illustrating an example of the mapping of a slot including a candidate position for an SSB transmission in the unlicensed frequency band included in the frequency band from 52.6 GHz to 71 GHz. As illustrated in FIG. 13, slots including a candidate position for an SSB transmission may be continuously arranged. That is, a slot that does not include a candidate position for an SSB transmission may be not included. As illustrated in FIG. 13, the number of symbols per slot may be 14. In this manner, by continuously arranging slots including a candidate position for an SSB transmission, Listen Before Talk (LBT) due to presence of a slot including a candidate position for an SSB transmission can be prevented from being performed again.

Figure 14:
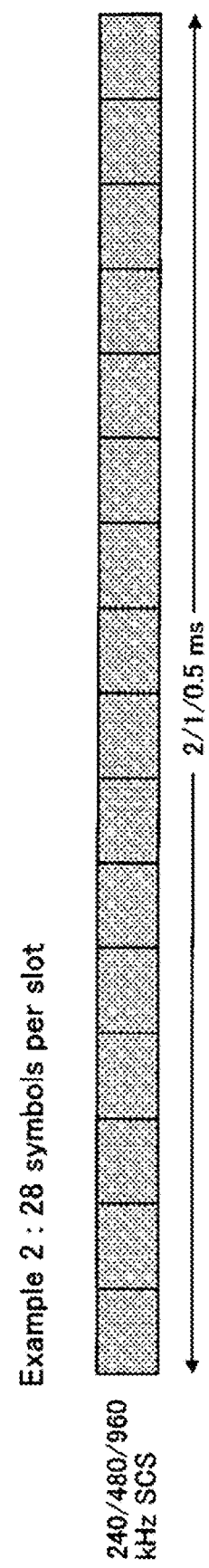
FIG. 14 is a diagram illustrating another example of the mapping of the slot including the candidate position for an SSB transmission in the unlicensed frequency band included in the frequency band from 52.6 GHz to 71 GHz.

FIG. 14 is a diagram illustrating another example of the mapping of the slot including the candidate position for an SSB transmission in the unlicensed frequency band included in the frequency band from 52.6 GHz to 71 GHz. As illustrated in FIG. 14, slots including a candidate position for an SSB transmission may be continuously arranged. That is, a slot that does not include a candidate position for an SSB transmission may be excluded. As illustrated in FIG. 14, the number of symbols per slot may be 28.

Three LSBs of an index of a candidate position for an SSB transmission may be indicated by a PBCH DMRS sequence.

Three MSBs of an index of a candidate position for an SSB transmission may be indicated by a PBCH payload.

In the NR-U, a slot including a candidate position for an SSB transmission is defined within 5 ms. Separately from this, a discovery burst transmission window may be included as a configuration of a serving cell. Duration of the discovery burst transmission window is selected from among 0.5 ms, 1 ms, 2 ms, 3 ms, 4 ms, and 5 ms. For example, in a case where the number of beams is small, by configuring a discovery burst transmission window with a shorter time, without setting the duration of the discovery burst transmission window to 5 ms, a load on the terminal 10 can be reduced. It is assumed that the discovery burst transmission window is necessary for the unlicensed frequency band included in the frequency band from 52.6 GHz to 71 GHz. For example, the maximum time length that can be set as the duration of the discovery burst transmission window in the unlicensed frequency band included in the frequency band from 52.6 GHz to 71 GHz may be shorter than 5 ms. For example, if the SCS is 240 kHz, the maximum time length that can be set as the duration the discovery burst transmission window may be 2 ms. In addition, a discovery burst transmission window (for example, 0.25 ms) having duration shorter than 0.5 ms may be introduced for a larger SCS. In addition, another candidate value (for example, 1.5 ms) in which granularity of the duration of the discovery burst transmission window is shorter than 1 ms may be introduced.

As described above, in the unlicensed frequency band included in the frequency band from 52.6 GHz to 71 GHz, a plurality of candidate positions for an SSB transmission may be configured for each SSB beam.

In the case of the operation of the unlicensed frequency band included in the frequency band from 52.6 GHz to 71 GHz, SSB indexes may be from 0 to 63, and an SSB index may be derived from an index of a candidate position for an SSB transmission and a QCL parameter in a PBCH payload.

Figure 15:
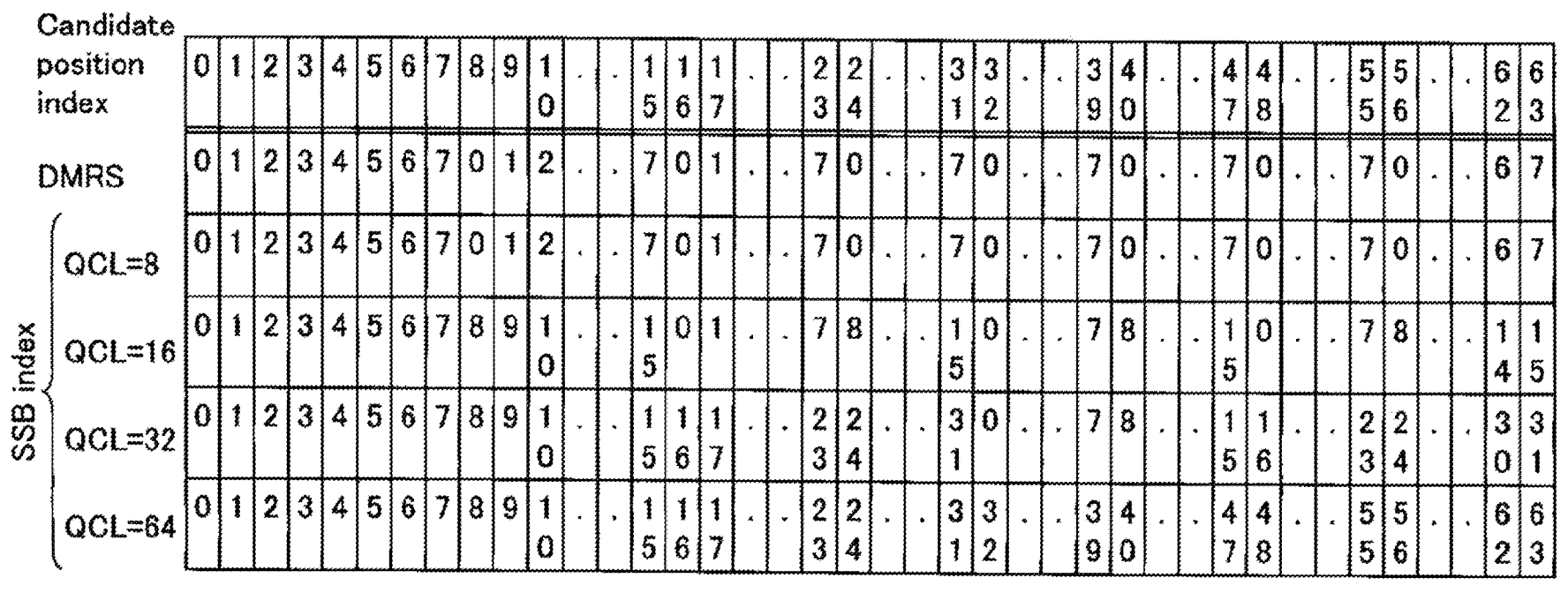

FIG. 15 is a diagram illustrating an example of deriving an SSB index by an SSB candidate position and a QCL parameter. For example, in a case where the value of the QCL parameter is 64, the SSB index may match the SSB candidate position.

For example, the QCL parameter may be selected from a set of candidate values such as {8, 16, 32, and 64}. Two bits (up to four candidate values) are preferable from the perspective of reusing the design of the NR-U. Alternatively, the number of candidate values of the QCL parameter may be different from that of another frequency band (for example, the number of candidate values in the frequency band of the NR-U may be less than or greater than 4). For example, when the number of candidate values is small, bits necessary for notification may be reduced.

The QCL parameter may be transmitted with the MIB, the SIB1, or the MIB and the SIB1. In a case where the QCL parameter is transmitted with the SIB1, the terminal 10 may assume (determine) a default QCL parameter (for example, 64) before receiving the SIB1.

The terminal 10 may assume (determine) that the number of SSBs actually transmitted in the discovery burst transmission window is less than or equal to the QCL parameter value (may assume (determine) that the number of SSBs is the same as the QCL parameter value, or may assume (determine) that the number of SSBs is smaller than the QCL parameter value).

The terminal 10 may assume (determine) that the SCS of the SSB is the same as that of the SIB1 PDCCH/PDSCH (or may assume (determine) that the SCS of the SSB is two times that of the SCS of the SIB1 PDCCH/PDSCH). A range of k_SSB, which is a parameter for transmitting a notification a shift value between a PRB of an SSB and a common PRB on which data or the like is transmitted, may be from 0 to 11, and may be signaled by ssb-SubcarrierOffset of the MIB.

For example, outside the MIB, a PBCH payload may be a total of eight bits, including 4 LSBs of an SFN, a half-frame bit, and 3 MSBs of an index of a candidate position for an SSB transmission.

For example, inside the MIB, a PBCH payload may 6 MSBs of an SFN, SSB-SubcarrierOffset (4 bits), dmrs-TypeA-Position (1 bit), pdcch-ConfigSIB1 (8 bits), cellBarred (1 bit), intraFregReselection (1 bit), subCarrierSpacingCommon (1 bit), and spare (1 bit).

The QCL parameter (for example, two bits) may be transmitted by any one of the following.

(Alt. 1) subCarrierSpacingCommon (case of the same SCS)+spare bit (Alt. 2) dmrs-TypeA-Position (case where one DMRS type A position is supported)+spare bit (Alt. 3) part of pdcch-ConfigAIB1 (+spare bit)

(Alt. 4) cellBarred+intraFreqReselection (case where only access other than stand-alone is supported)

Any one combination of Alt. 1 to Alt. 4.

The ssb-PositionsInBurst in SIB1/RRC may be a bit map of 64 bits, and the number of "1" included in the ssb-PositionsInBurst may be less than or equal to the value of the QCL parameter.

(Device Configuration)

Next, a functional configuration example of the terminal 10 and the base station 20 which execute the above-described processing operations is described. The terminal 10 and the base station 20 are provided with all functions described in the embodiments. However, the terminal 10 and the base station 20 may be provided with partial functions among the all functions described in the embodiments. Note that, the terminal 10 and the base station 20 may be collectively referred to as a communication device.

<Terminal>

Figure 16:
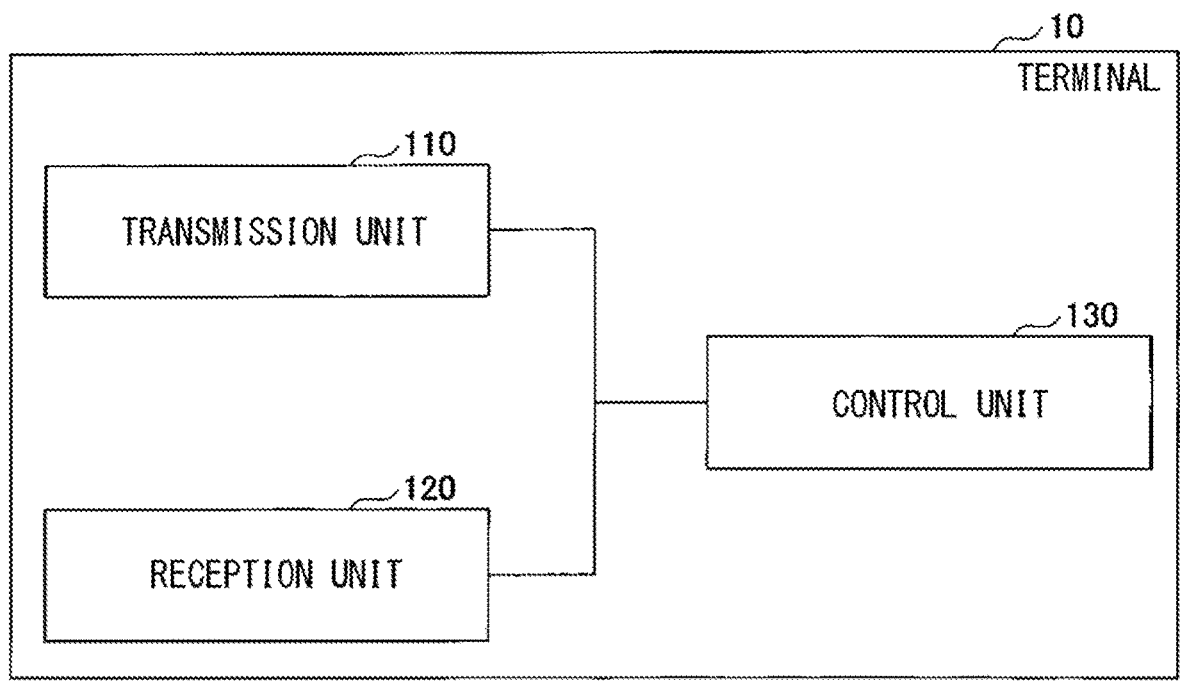
FIG. 16 is a diagram illustrating an example of a functional configuration of a terminal.

FIG. 16 is a diagram illustrating an example of a functional configuration of the terminal 10. As illustrated in FIG. 16, the terminal 10 includes a transmission unit 110, a reception unit 120, and a control unit 130. The functional configuration illustrated in FIG. 16 is illustrative only. A functional division and the names of the functional units may be any division and name as long as the operation according to the embodiments can be executed. Note that, the transmission unit 110 may be referred to as a transmitter, and the reception unit 120 may be referred to as a receiver.

The transmission unit 110 creates transmission from transmission data, and wirelessly transmits the transmission signal. The transmission unit 110 may form one or a plurality of beams. The reception unit 120 wirelessly receives various signals, and acquires a signal of a higher layer from a received physical layer signal. In addition, the reception unit 120 includes a measurement unit that performs measurement of a signal that is received to obtain received power or the like.

The control unit 130 performs control of the terminal 10. Note that, a function of the control unit 130 which relates to transmission may be included in the transmission unit 110, and a function of the control unit 130 which relates to reception may be included in the reception unit 120.

For example, in the unlicensed frequency band included in the frequency band from 52.6 GHz to 71 GHz, the reception unit 120 may receive a synchronization signal block (SSB) transmitted from the base station 20, and the control unit 130 may derive the candidate position for an SSB transmission based on a demodulation reference signal (DMRS) sequence of a broadcast channel (PBCH) and the PBCH payload. In addition, the control unit 130 may assume (determine) that the SSB index takes any one value among 0 to 63, and may derive the SSB index from the candidate position for an SSB transmission and a Quasi co-location (QCL) parameter in the PBCH payload.

For example, in the unlicensed frequency band included in the frequency band from 52.6 GHz to 71 GHz, the control unit 130 may assume (determine) that slots, each including a candidate position for an SSB transmission, are continuously arranged.

<Base Station 20>

Figure 17:
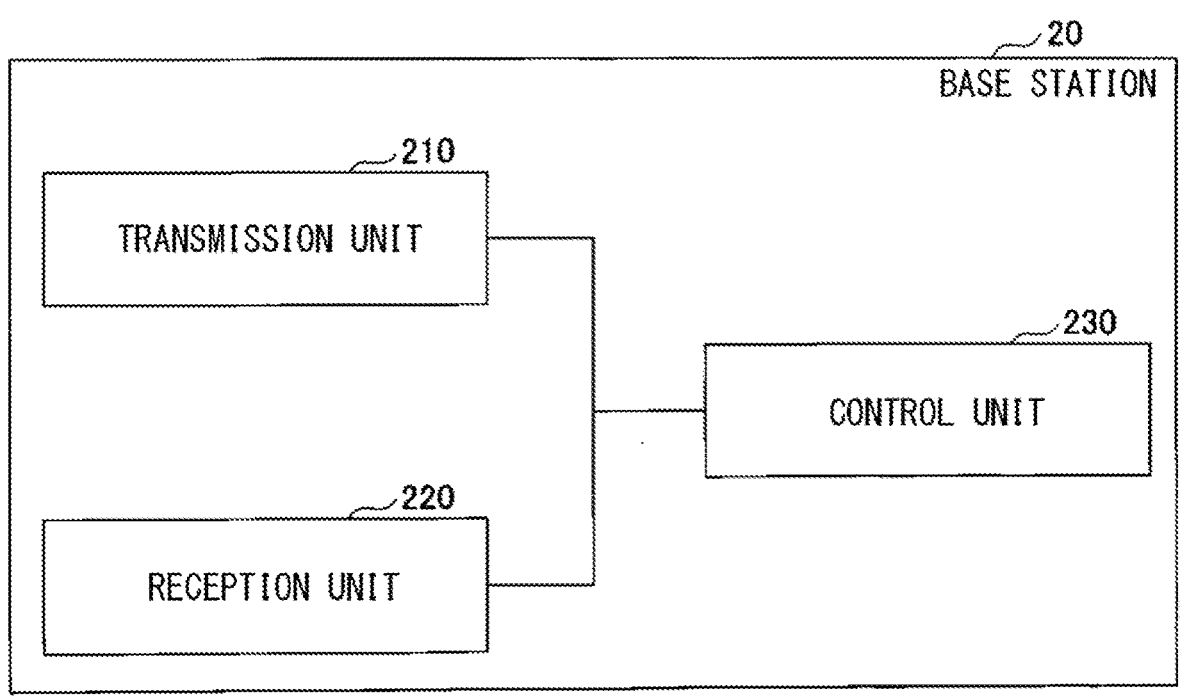
FIG. 17 is a diagram illustrating an example of a functional configuration of a base station.

FIG. 17 is a diagram illustrating an example of a functional configuration of the base station 20. As illustrated in FIG. 17, the base station 20 includes a transmission unit 210, a reception unit 220, and a control unit 230. A functional configuration illustrated in FIG. 17 is illustrative only. A functional division and the names of the functional units may be any division and name as long as the operation according to the embodiments can be executed. Note that, the transmission unit 210 may be referred to as a transmitter, and the reception unit 220 may be referred to as a receiver.

The transmission unit 210 includes a function of generating a signal to be transmitted to the terminal 10 side, and wirelessly transmitting the signal. The reception unit 220 includes a function of receiving various signals transmitted from the terminal 10, and acquiring, for example, information of a higher layer from the received signals. In addition, the reception unit 220 includes a measurement unit that performs measurement of a signal that is received to obtain received power or the like.

The control unit 230 performs control of the base station 20. Note that, a function of the control unit 230 which relates to transmission may be included in the transmission unit 210, and a function of the control unit 230 which relates to reception may be included in the reception unit 220.

In the unlicensed frequency band included in the frequency band from 52.6 GHz to 71 GHz, the control unit 230 may configure the demodulation reference signal (DMRS) sequence of the broadcast channel (PBCH) corresponding to the candidate position for an SSB transmission, and the PBCH payload, and the transmission unit 210 may transmit a synchronization signal block (SSB) including the PBCH DMRS sequence and the PBCH payload which are configured. In addition, the control unit 230 may select an SSB index of any one value among 0 to 63, and may transmit the SSB at a transmission position and a beam which correspond to the SSB index.

For example, in the unlicensed frequency band including the frequency band from 52.6 GHz to 71 GHz, the control unit 230 may continuously arrange slots, each including a candidate position for an SSB transmission.

<Hardware Configuration>

The block diagrams (FIG. 16 and FIG. 17) which are used in description of the embodiments illustrate blocks in a functional unit. The functional blocks (components) are implemented by a combination of hardware and/or software. In addition, means for implementing respective functional blocks is not particularly limited. That is, the respective functional blocks may be implemented by one device in which a plurality of elements are physically and/or logically combined. In addition, two or more devices, which are physically and/or logically separated from each other, may be directly and/or indirectly connected (for example, in a wired manner and/or a wireless manner), and the respective functional blocks may be implemented by a plurality of the devices.

Figure 18:
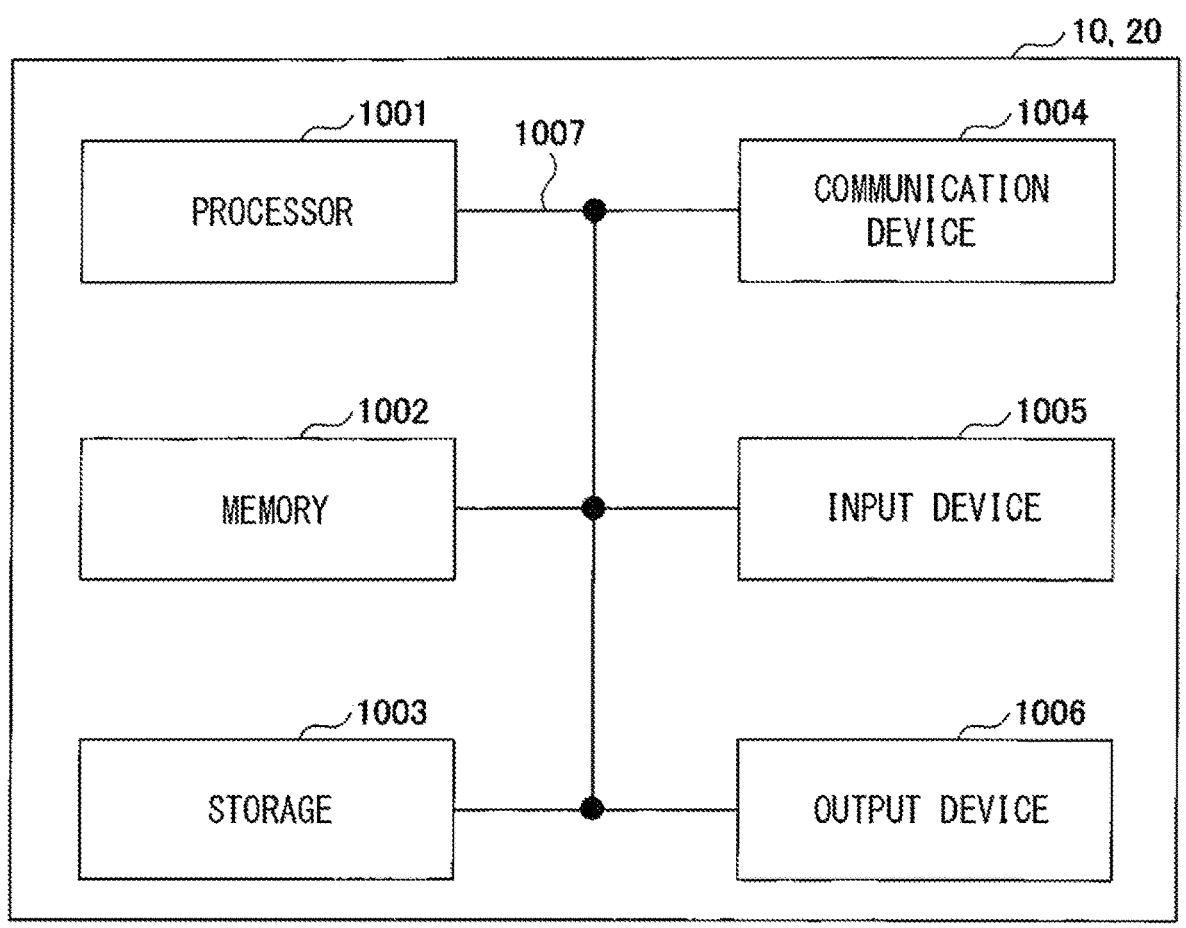
FIG. 18 is a diagram illustrating an example of a hardware configuration of the terminal and the base station.

For example, each of the terminal 10 and the base station 20 according to an embodiment of the present invention may function as a computer performing the process according to the embodiments. FIG. 18 is a diagram illustrating an example of a hardware configuration of the terminal 10 and the base station 20 according to the embodiments. Each of the above-described terminal 10 and base station 20 may be physically configured as a computer device including a processor 1001, a memory 1002, an storage 1003, a communication device 1004, an input device 1005, an output device 1006, a bus 1007, and the like.

In the following description, the term "device" can be replaced with a circuit, a device, a unit, or the like. The hardware configuration of the terminal 10 and the base station 20 may include one or more of the devices denoted by 1001-1006 in the figure, or may be configured without some devices.

Each function of the terminal 10 and the base station 20 is implemented by loading predetermined software (program) on hardware, such as the processor 1001 and the memory 1002, so that the processor 1001 performs computation and controls communication by the communication device 1004, and reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, and the like.

Additionally, the processor 1001 reads a program (program code), a software module, or data from the storage 1003 and/or the communication device 1004 to the memory 1002, and executes various processes according to these. As the program, a program is used that causes a computer to execute at least a part of the operations described in the above-described embodiments. For example, the transmission unit 110, the reception unit 120, and the control unit 130 of the terminal 10 illustrated in FIG. 16 may be implemented by a control program that is stored in the memory 1002 and that is operated by the processor 1001. Furthermore, for example, the transmission unit 210, the reception unit 220, and the control unit 230 of the base station 20 illustrated in FIG. 17 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), a Random Access Memory (RAM), and the like. The memory 1002 may be referred to as a register, a cache, a main memory (main storage device), or the like. The memory 1002 may store a program (program code), a software module, or the like, which can be executed for implementing the process according to one embodiment of the present invention. 10t The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, and the like. The storage 1003 may be referred to as an auxiliary storage device. The above-described storage medium may be, for example, a database including the memory 1002 and/or the storage 1003, a server, or any other suitable medium.

The communication device 1004 is hardware (transmitting and receiving device) for performing communication between computers through a wired network and/or a wireless network, and is also referred to, for example, as a network device, a network controller, a network card, a communication module, or the like. For example, the transmission unit 110 and the reception unit 120 of the terminal 10 may be implemented by the communication device 1004. Furthermore, the transmission unit 210 and the reception unit 220 of the base station 20 may be implemented by the communication device 1004.

The input device 1005 is an input device (e.g., a keyboard, a mouse, a microphone, a switch, a button, and/or a sensor) that receives an external input. The output device 1006 is an output device (e.g., a display, a speaker, and/or an LED lamp) that performs output toward outside. The input device 1005 and the output device 1006 may be configured to be integrated (e.g., a touch panel).

Each device, such as the processor 1001 and the memory 1002, is also connected by the bus 1007 for communicating information. The bus 1007 may be formed of a single bus or may be formed of different buses between devices.

The terminal 10 and the base station 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented by at least one of these hardware components.

CONCLUSION OF THE EMBODIMENTS

In the specification, at least the terminal and the base station described below are disclosed.

A terminal including a reception unit that receives a synchronization signal block in an unlicensed band of a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a control unit that identifies an index of a candidate position for transmitting the synchronization signal block based on a sequence of a demodulation reference signal of a broadcast channel included in the synchronization signal block and a payload of the broadcast channel.

According to the configuration, in the unlicensed band of the high frequency band higher than or equal to frequency range 2 that is a second frequency band in the NR system, the base station can signal the candidate position for the synchronization signal block transmission to the terminal.

The control unit may determine that a number of continuously arranged slots, each including a candidate position for transmitting the synchronization signal block, is greater than eight.

According to the configuration, multiple synchronization signal blocks can be continuously transmitted by applying the LBT in the unlicensed band of a high frequency band higher than a frequency band of a frequency range 2 that is a second frequency band in a new radio (NR) system.

The control unit may identify an index of a synchronization signal block based on a quasi co-location (QCL) parameter included in the index of the candidate position for transmitting the synchronization signal block and the broadcast channel.

According to the configuration, the terminal can identify the index of the synchronization signal block by receiving the synchronization signal block.

The control unit may determine that a duration of a discovery burst transmission window configured in the unlicensed band is shorter than a duration of a discovery burst transmission window configured in the FR1.

According to the configuration, a load on the terminal to identify the candidate position for the synchronization signal block transmission can be reduced.

A base station including a control unit that configures a sequence of a demodulation reference signal of a broadcast channel and a payload of the broadcast channel that are associated with an index of a candidate position for transmitting a synchronization signal block in an unlicensed band of a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a transmission unit that transmits the synchronization signal block including the sequence of the demodulation reference signal of the broadcast channel and the payload of the broadcast channel which are configured.

According to the configuration, in the unlicensed band of the high frequency band higher than or equal to frequency range 2 that is a second frequency band in the NR system, the base station can signal the candidate position for the synchronization signal block transmission to the terminal.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the present invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the terminal 10 and the base station 20 are described using the functional block diagrams, but such devices may be implemented by hardware, software, or a combination thereof. Software executed by the processor included in the terminal 10 according to the embodiments of the present invention and software executed by the processor included in the base station 20 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present specification and may be provided by any other method. For example, the notification of information may be provided by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present specification may be applied to Long Term Evolution (LTE), LTE-advanced (LTE-A), SUPER 3G, IMT-advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system using any other appropriate system, and/or next generation systems extended based on these standards.

The processing procedures, the sequences, the flowcharts, and the like of the respective aspects/embodiments described in the present specification may be reversed in order provided that there is no contradiction. For example, the method described in the present specification presents elements of various steps with an exemplary order and is not limited to a presented specific order.

In the present specification, a specific operation to be performed by the base station 20 may be performed by an upper node in some cases. In the network including one or more network nodes including the base station 20, various operations performed for communication with the terminal 10 can be obviously performed by the base station 20 and/or any network node (for example, an MME, an S-GW, or the like is considered, but it is not limited thereto) other than the base station 20. A case is exemplified above in which there is one network node other than the base station 20. The one network node may be a combination of a plurality of other network nodes (e.g., MME and S-GW).

The aspects/embodiments described in this specification may be used alone, in combination, or switched with implementation.

The terminal 10 may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The base station 20 may be defined by those skilled in the art as a NodeB (NB), enhanced node B (eNB), base station, gNB, or several appropriate terminologies.

A bandwidth part (BWP: Bandwidth Part) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it is not be assumed that the UE transmits and receives a predetermined signal/channel outside an active BWP. Further, a "cell," a "carrier," or the like in the present disclosure may be replaced with a "BWP."

The terms "determine (determining)" and "decide (determining)" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The description "based on" in this specification does not represent "only based on" unless otherwise stated. In other words, description of "based on" represents both "only based on" and "at least based on."

In this specification or the appended claims, in a case where "include," "including," and a modification thereof are used, these terms are intended as comprehensive terms similar to "comprising." In addition, a term "or" that is used in this specification and the appended claims is not intended as an exclusive OR.

In the entire present disclosure, for example, when an article such as "a," "an," and "the" in English is added by a translation, the article may include multiple things, unless the context explicitly indicates that the article does not include the multiple things.

Although the present invention is described above in detail, it is obvious to those skilled in the art that the present invention is not limited to the embodiments described in the specification. The present invention may be implemented as revised and modified embodiments without departing from the gist and scope of the present invention as set forth in claims. Accordingly, the description of the specification is for the purpose of illustration and does not have any restrictive meaning to the present invention.

LIST OF REFERENCE SYMBOLS 10 terminal
110 transmission unit
120 reception unit
130 control unit
20 base station
210 transmission unit
220 reception unit
230 control unit
1001 processor
1002 memory
1003 storage
1004 communication device
1005 input device
1006 output device

The invention claimed is:

1. A terminal of a radio communication system for performing communication in a first frequency band and a second frequency band, the second frequency band being higher than the first frequency band, the terminal comprising:
 a receiver that receives first configuration information and second configuration information, wherein the first configuration information includes a Quasi co-location, QCL, parameter for a reception of a synchronization signal block in the second frequency band, the QCL parameter being selected from among a first number of candidates for the QCL parameter, the first number being less than a second number of candidates for another QCL parameter to be used in the first frequency band, and wherein the second configuration information allows to configure a second discovery burst transmission window for the reception of the synchronization signal block in the second frequency band such that a maximum value and a minimum value of a length of the second discovery burst transmission window are less than a maximum value and a minimum value of a length of a first discovery burst transmission window in the first frequency band, respectively, and that granularity to set the length of the second discovery burst transmission window is finer than granularity to set the length of the first discovery burst transmission window in the first frequency band; and
 a controller that sets the QCL parameter based on the first configuration information and that sets the length of the second discovery burst transmission window based on the second configuration information,
 wherein the receiver assumes that a number of the synchronization signal blocks to be received within the second discovery burst transmission window is less than a value of the QCL parameter set by the controller.

2. The terminal according to claim 1, wherein the receiver receives the QCL parameter transmitted in a subCarrierSpacingCommon in a Master Information Block, MIB.

3. A base station of a radio communication system for performing communication in a first frequency band and a second frequency band, the second frequency band being higher than the first frequency band, the base station comprising:

a transmitter that transmits first configuration information and second configuration information, wherein the first configuration information includes a Quasi co-location, QCL, parameter for a reception of a synchronization signal block in the second frequency band, the QCL parameter being selected from among a first number of candidates for the QCL parameter, the first number being less than a second number of candidates for another QCL parameter to be used in the first frequency band, and wherein the second configuration information allows to configure a second discovery burst transmission window for the reception of the synchronization signal block in the second frequency band such that a maximum value and a minimum value of a length of the second discovery burst transmission window are less than a maximum value and a minimum value of a length of a first discovery burst transmission window in the first frequency band, respectively, and that granularity to set the length of the second discovery burst transmission window is finer than granularity to set the length of the first discovery burst transmission window in the first frequency band; and a controller that sets the QCL parameter based on the first configuration information and that sets the length of the second discovery burst transmission window based on the second configuration information, wherein the transmitter transmits a number of the synchronization signal blocks within the second discovery burst transmission window, the number of the synchronization signal blocks transmitted within the second discovery burst transmission window being less than a value of the QCL parameter set by the controller.

4. A communication system for performing communication in a first frequency band and a second frequency band, the second frequency band being higher than the first frequency band, comprising:

a base station comprising:

a transmitter that transmits first configuration information and second configuration information, wherein the first configuration information includes a Quasi co-location, QCL, parameter for a reception of a synchronization signal block in the second frequency band, the QCL parameter being selected from among a first number of candidates for the QCL parameter, the first number being less than a second number of candidates for another QCL parameter to be used in the first frequency band, and wherein the second configuration information allows to configure a second discovery burst transmission window for the reception of the synchronization signal block in the second frequency band such that a maximum value and a minimum value of a length of the second discovery burst transmission window are less than a maximum value and a minimum value of a length of a first discovery burst transmission window in the first frequency band, respectively, and that granularity to set the length of the second discovery burst transmission window is finer than granularity to set the length of the first discovery burst transmission window in the first frequency band; and a controller that sets the QCL parameter based on the first configuration information and that sets the length of the second discovery burst transmission window based on the second configuration information, wherein the transmitter transmits a number of the synchronization signal blocks within the second discovery burst transmission window, the number of the synchronization signal blocks transmitted within the second discovery burst transmission window being less than a value of the QCL parameter set by the controller; and a terminal comprising:

a receiver that receives the first configuration information and the second configuration information, wherein the receiver assumes that the number of the synchronization signal blocks to be received within the second discovery burst transmission window is less than the value of the QCL parameter set by the controller.

5. A communication method executed by a terminal of a radio communication system for performing communication in a first frequency band and a second frequency band, the second frequency band being higher than the first frequency band, the terminal comprising:

receiving first configuration information and second configuration information, wherein the first configuration information includes a Quasi co-location, QCL, parameter for a reception of a synchronization signal block in the second frequency band, the QCL parameter being selected from among a first number of candidates for the QCL parameter, the first number being less than a second number of candidates for another QCL parameter to be used in the first frequency band, and wherein the second configuration information allows to configure a second discovery burst transmission window for the reception of the synchronization signal block in the second frequency band such that a maximum value and a minimum value of a length of the second discovery burst transmission window are less than a maximum value and a minimum value of a length of a first discovery burst transmission window in the first frequency band, respectively, and that granularity to set the length of the second discovery burst transmission window is finer than granularity to set the length of the first discovery burst transmission window in the first frequency band; and setting the QCL parameter based on the first configuration information and setting the length of the second discovery burst transmission window based on the second configuration information, wherein the receiving assumes that a number of the synchronization signal blocks to be received within the second discovery burst transmission window is less than a value of the QCL parameter set by the setting.

* * * * *